US012565595B2

(12) United States Patent
Watanabe

(10) Patent No.: US 12,565,595 B2
(45) Date of Patent: Mar. 3, 2026

(54) AQUEOUS COATING MATERIAL COMPOSITION AND METHOD FOR FORMING MULTILAYER COATING FILM

(71) Applicant: KANSAI PAINT CO., LTD., Hyogo (JP)

(72) Inventor: Kazuya Watanabe, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 119 days.

(21) Appl. No.: 18/273,410

(22) PCT Filed: Dec. 16, 2021

(86) PCT No.: PCT/JP2021/046619
§ 371 (c)(1),
(2) Date: Jul. 20, 2023

(87) PCT Pub. No.: WO2022/230231
PCT Pub. Date: Nov. 3, 2022

(65) Prior Publication Data
US 2024/0309239 A1     Sep. 19, 2024

(30) Foreign Application Priority Data
Apr. 28, 2021     (JP) ................................. 2021-075745

(51) Int. Cl.
| | |
|---|---|
| *C09D 175/04* | (2006.01) |
| *C09D 5/00* | (2006.01) |
| *C09D 7/63* | (2018.01) |
| *C09D 7/65* | (2018.01) |

(52) U.S. Cl.
CPC ........... *C09D 175/04* (2013.01); *C09D 5/002* (2013.01); *C09D 7/63* (2018.01); *C09D 7/65* (2018.01)

(58) Field of Classification Search
CPC .................................................... C09D 175/04
See application file for complete search history.

(56) References Cited

U.S. PATENT DOCUMENTS

| | | | | |
|---|---|---|---|---|
| 5,491,174 A | * | 2/1996 | Grier ........................ | D06N 3/14 528/80 |
| 5,876,802 A | * | 3/1999 | Brunnemann ..... | C08G 18/6254 523/415 |
| 2010/0189905 A1 | | 7/2010 | Nakahara et al. | |
| 2011/0287074 A1 | * | 11/2011 | Jin ........................ | A61K 31/695 556/454 |

FOREIGN PATENT DOCUMENTS

| | | | |
|---|---|---|---|
| JP | 2009234009 A | | 10/2009 |
| JP | 2018178090 A | * | 11/2018 |
| JP | 2019198861 A | | 11/2019 |
| WO | WO-2017073697 A1 | | 5/2017 |

OTHER PUBLICATIONS

JP2018178090, machine translation. (Year: 2018).*
International Search Report issued in International Pat. Appl. No. PCT/JP2021/046619, dated Mar. 15, 2022.

* cited by examiner

*Primary Examiner* — Robert A Vetere
(74) *Attorney, Agent, or Firm* — Marshall, Gerstein & Borun LLP

(57) ABSTRACT

An object of the present invention is to provide an aqueous coating material composition that has excellent storage stability and that demonstrates high coating film performance and strong glass adhesiveness even when cured at a relatively low temperature. The present invention discloses an aqueous coating material composition including (A) a hydroxyl group- and carboxyl group-containing resin, (B) a blocked polyisocyanate compound, (C) a polycarbodiimide compound, and (D) a basic compound. The basic compound (D) includes (D1) a basic compound having an acid dissociation constant (PKa) in a range from 7.0 to 8.5 and a boiling point in a range from 100 to 200° C. A content ratio of the basic compound (D1) is in a range from 30 to 100 mass % based on the mass of the basic compound (D). The aqueous coating material composition has a pH in a range from 8.0 to 11.5.

6 Claims, No Drawings

AQUEOUS COATING MATERIAL COMPOSITION AND METHOD FOR FORMING MULTILAYER COATING FILM

TECHNICAL FIELD

The present invention relates to an aqueous coating material composition and a method for forming a multilayer coating film.

BACKGROUND ART

In automobile coating, a method for forming a multilayer coating film through a three-coat two-bake (3C2B) technique is widely used. The 3C2B technique includes applying an electrodeposition coating material onto an object to be coated, then applying an intermediate coating material thereon, baking and curing, applying an aqueous base coating material thereon, preheating, applying a clear coating material thereon, and baking and curing. However, in recent years, from the perspective of energy conservation, a three-coat one-bake (3C1B) technique is becoming popular. In the 3C1B technique, the process of baking and curing after applying the intermediate coating material is omitted. The 3C1B technique includes applying an electrodeposition coating material onto an object to be coated, then applying an aqueous intermediate coating material thereon, preheating as needed, applying an aqueous base coating material thereon, preheating, applying a clear coating material thereon, and baking and curing.

Furthermore, recently, there has been a demand for lowering the heating temperature in the baking and curing process in order to further reduce the energy used.

However, a coating material composition having high curability even when the heating temperature is relatively low generally has high reactivity. For this reason, sufficient coating film performance such as hardness, chipping resistance, and water resistance and sufficient storage stability sometimes cannot be achieved at the same time.

In addition, in automotive manufacturing specifications, a member such as a front glass, a rear glass, or another glass member is generally fixed on a multilayer coating film via an adhesive layer formed on the multilayer coating film. However, when an attempt is made to improve the chipping resistance by, for example, softening the intermediate coating film, the multilayer coating film under the adhesive layer may undergo cohesive failure, or peeling may occur at the interface between the electrodeposition coating film and the intermediate coating film, resulting in poor adhesion to the member.

JP 2019-198861 A describes a method for forming a multilayer coating film in which the following steps (1) to (4) are sequentially performed on an electrodeposition-coated alloyed hot-dip galvanized steel sheet.

Step (1): applying an aqueous intermediate coating material (A) onto an electrodeposition coating film to form an intermediate coating film;

Step (2): performing preheating and then applying an aqueous base coating material (B) onto the intermediate coating film to form a base coating film;

Step (3): performing preheating and then applying a clear coating material (C) onto the base coating film to form a clear coating film;

Step (4): heating and curing the intermediate coating film, the base coating film, and the clear coating film formed in the steps (1) to (3).

The aqueous intermediate coating material (A) contains a hydroxyl group-containing acrylic resin (a1) having a glass transition temperature (Tg) in a range from 5 to 15° C. and having a weight-average molecular weight in a range from 30000 to 40000, a polyurethane resin (a2) having a glass transition temperature (Tg) of −50° C. or less and having a polyether backbone, a hydroxyl group-containing polyester resin (a3), a melamine resin (a4), and an active methylene-blocked polyisocyanate compound (a5). The use ratio of the hydroxyl group-containing acrylic resin (a1) to the polyurethane resin (a2) is in a range from 20/10 to 30/10 in terms of solids content ratio. A coating film formed after heating and curing the aqueous intermediate coating material (A) has an elongation at break at 20° C. in a range from 20 to 30%, a Young's modulus in a range from 5000 to 6000 kgf/cm2, and a Tukon hardness in a range from 4 to 6. The clear coating material (C) contains a hydroxyl group-containing acrylic resin (c1) and an allophanate group-containing polyisocyanate compound (c2).

Although the method for forming a multilayer coating film above provides good glass adhesiveness, coating film performance, and storage stability, it has become desirable in recent years from the viewpoint of energy conservation to lower the heating temperature.

SUMMARY OF INVENTION

The present invention aims to provide an aqueous coating material composition that has excellent storage stability and that demonstrates high coating film performance and strong glass adhesiveness even when cured at a relatively low temperature.

After conducting intensive studies to achieve the above object, the present inventors found that the above object can be achieved by using an aqueous coating material composition including (A) a hydroxyl group- and carboxyl group-containing resin, (B) a blocked polyisocyanate compound. (C) a polycarbodiimide compound, and (D) a basic compound. The basic compound (D) includes (D1) a basic compound having an acid dissociation constant (PKa) in a range from 7.0 to 8.5 and a boiling point in a range from 100 to 200° C.; a content ratio of the basic compound (D1) is in a range from 30 to 100 mass % based on the mass of the basic compound (D). The aqueous coating material composition has a pH in a range from 8.0 to 11.5.

The present invention provides an aqueous coating material composition and a method for forming a multilayer coating film including the following aspects.

Aspect 1. An aqueous coating material composition including (A) a hydroxyl group- and carboxyl group-containing resin, (B) a blocked polyisocyanate compound, (C) a polycarbodiimide compound, and (D) a basic compound, wherein the basic compound (D) includes (D1) a basic compound having an acid dissociation constant (PKa) in a range from 7.0 to 8.5 and a boiling point in a range from 100 to 200° C.;

a content ratio of the basic compound (D1) is in a range from 30 to 100 mass % based on a mass of the basic compound (D); and the aqueous coating material composition has a pH in a range from 8.0 to 11.5.

Aspect 2. The aqueous coating material composition according to Aspect 1, wherein at least part of a blocking agent of the blocked polyisocyanate compound (B) is an active methylene-based blocking agent.

Aspect 3. The aqueous coating material composition according to Aspect 1 or 2, wherein the basic compound (D1) having the acid dissociation constant (PKa) in the range from 7.0 to 8.5 and the boiling point in the range from 100 to 200° C. is N-methylmorpholine and/or N-ethylmorpholine.

Aspect 4. The aqueous coating material composition according to any one of Aspects 1 to 3, further containing a melamine resin (E).

Aspect 5. A method of forming a multilayer coating film including, in sequence:

(1) applying the aqueous coating material composition according to any one of Aspects 1 to 4 onto an object to be coated to form an intermediate coating film;

(2) applying an aqueous basecoat coating material composition onto the intermediate coating film formed in (1) to form a basecoat coating film;

(3) applying a clear coating material composition onto the basecoat coating film formed in (2) to form a clear coating film; and (4) heating and curing, all at once at a temperature in a range from 60 to 110° C., the intermediate coating film formed in (1), the basecoat coating film formed in (2), and the clear coating film formed in (3).

The aqueous coating material composition according to an embodiment of the present invention has excellent storage stability and forms a coating film demonstrating good glass adhesiveness and excellent coating film performance such as high hardness and water resistance even when cured at a relatively low temperature.

DETAILED DESCRIPTION OF EMBODIMENTS

Hereinafter, the aqueous coating material composition according to an embodiment of the present invention (hereinafter may be referred to as "the present coating material") will be described in more detail.

Aqueous Coating Material Composition

The aqueous coating material composition according to an embodiment of the present invention includes (A) a hydroxyl group- and carboxyl group-containing resin, (B) a blocked polyisocyanate compound, (C) a polycarbodiimide compound, and (D) a basic compound. The basic compound (D) includes (D1) a basic compound having an acid dissociation constant (PKa) in a range from 7.0 to 8.5 and a boiling point in a range from 100 to 200° C. A content ratio of the basic compound (D1) is in a range from 30 to 100 mass % of the mass of the basic compound (D). The aqueous coating material composition has a pH in a range from 8.0 to 11.5.

In the present specification, an aqueous coating material is a term used in contrast to an organic solvent-based coating material, and usually means a coating material formed by dispersing and/or dissolving a coating film-forming resin, a pigment, and the like in water or a medium containing water as the main component (aqueous media). The organic solvent-based coating material mentioned above refers to a coating material in which the solvent is substantially free of water, or a coating material in which the solvent contains only or mostly an organic solvent.

The aqueous coating material composition according to an embodiment of the present invention has a pH in a range from 8.0 to 11.5.

When the pH is 8.0 or greater, the resulting aqueous coating material composition has excellent storage stability;

meanwhile, when the pH is 11.5 or less, the resulting aqueous coating material composition forms a coating film having excellent hardness, water resistance, and glass adhesiveness.

In particular, the pH is preferably within a range from 8.5 to 11.0, more preferably within a range from 9.0 to 10.5.

Hydroxyl Group- and Carboxyl Group-Containing Resin (A)

The hydroxyl group- and carboxyl group-containing resin (A) is not limited as long as it contains a hydroxyl group and a carboxyl group. Specific examples of the type of the resin include an acrylic resin, a polyester resin, a polyether resin, a polycarbonate resin, and a polyurethane resin. In particular, the hydroxyl group- and carboxyl group-containing resin (A) is preferably an acrylic resin, a polyester resin, or a polyurethane resin containing a hydroxyl group and a carboxyl group.

Hydroxyl Group- and Carboxyl Group-Containing Acrylic Resin (A1)

The hydroxyl group- and carboxyl group-containing acrylic resin (A1) can be synthesized by copolymerizing a hydroxyl group-containing polymerizable unsaturated monomer (M-1), a carboxyl group-containing polymerizable unsaturated monomer (M-2), and an additional copolymerizable polymerizable unsaturated monomer (M-3) by a common method.

The hydroxyl group-containing polymerizable unsaturated monomer (M-1) is a compound having one hydroxyl group and one polymerizable unsaturated bond per molecule, with the hydroxyl group mainly acting as a functional group that reacts with a cross-linking agent. Specifically, the hydroxyl group-containing polymerizable unsaturated monomer (M-1) is preferably a monoesterified product of acrylic acid or methacrylic acid and a dihydric alcohol having from 2 to 10 carbons, such as 2-hydroxyethyl (meth) acrylate, 2-hydroxypropyl (meth)acrylate, and 4-hydroxybutyl (meth)acrylate.

In addition to the above-mentioned compounds, examples of the monoesterified product of acrylic acid or methacrylic acid and a polyhydric alcohol include compounds produced by adding a ring-opening polymer such as ε-caprolactone to a monoesterified product of 2-hydroxyethyl (meth)acrylate or the like. Such compounds include: "Placcel FA-1", "Placcel FA-2", "Placcel FA-3", "Placcel FA-4", "Placcel FA-5", "Placcel FM-1", "Placcel FM-2", "Placcel FM-3", "Placcel FM-4", and "Placcel FM-5" (product names, all available from Daicel Corporation); polyethylene glycol mono(meth) acrylate and polypropylene glycol mono(meth)acrylate; 2-hydroxy-3-phenoxypropyl (meth)acrylate and 2-hydroxy-3-butoxypropyl (meth)acrylate; and phthalic acid monohydroxyethyl (meth)acrylate. These can be used alone or in combination of two or more types.

However, in the present invention, the monomers corresponding to "(xvi) Polymerizable unsaturated monomers having a UV-absorbing functional group" described below, even when having a hydroxyl group, should be defined as the above-described "additional copolymerizable polymerizable unsaturated monomer (M-3)" and are excluded from the "hydroxyl group-containing polymerizable unsaturated monomer (M-1)".

The carboxyl group-containing polymerizable unsaturated monomer (M-2) is a compound having one or more carboxyl groups and one polymerizable unsaturated bond per molecule, and examples thereof include acrylic acid, methacrylic acid, crotonic acid, itaconic acid, maleic acid, and maleic anhydride. These can be used alone or in combination of two or more types.

The additional copolymerizable polymerizable unsaturated monomer (M-3) is a compound that has one or more polymerizable unsaturated bonds per molecule and that is neither the monomer (M-1) nor (M-2), and specific examples thereof are listed below.

(i) Alkyl or cycloalkyl (meth)acrylates: such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate.

(ii) Polymerizable unsaturated monomers having an isobornyl group: such as isobornyl (meth)acrylate.

(iii) Polymerizable unsaturated monomers having an adamantyl group: such as adamantyl (meth)acrylate.

(iv) Polymerizable unsaturated monomers having a tricyclodecenyl group: such as tricyclodecenyl (meth)acrylate.

(v) Aromatic ring-containing polymerizable unsaturated monomers: such as benzyl (meth)acrylate, styrene, α-methylstyrene, and vinyl toluene.

(vi) Polymerizable unsaturated monomers having an alkoxysilyl group: such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane.

(vii) Polymerizable unsaturated monomers having a fluorinated alkyl group: such as perfluoroalkyl (meth)acrylates such as perfluorobutylethyl (meth)acrylate and perfluorooctylethyl (meth)acrylate; and fluoroolefins.

(viii) Polymerizable unsaturated monomers having a photopolymerizable functional group: such as a maleimide group.

(ix) Vinyl compounds: such as N-vinylpyrrolidone, ethylene, butadiene, chloroprene, vinyl propionate, and vinyl acetate.

(x) Nitrogen-containing polymerizable unsaturated monomers: such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth)acrylamide, and adducts of glycidyl (meth)acrylate and amine compounds.

(xi) Polymerizable unsaturated monomers having two or more polymerizable unsaturated groups per molecule: such as allyl (meth)acrylate, ethylene glycol di(meth)acrylate, 1,4-butanediol di(meth)acrylate, neopentyl glycol di(meth)acrylate, and 1,6-hexanediol di(meth)acrylate.

(xii) Epoxy group-containing polymerizable unsaturated monomers: such as glycidyl (meth)acrylate, β-methylglycidyl (meth)acrylate, 3,4-epoxycyclohexyl methyl (meth)acrylate, 3,4-epoxycyclohexyl ethyl(meth)acrylate, 3,4-epoxycyclohexylpropyl (meth)acrylate, and allyl glycidyl ether.

(xiii) (Meth)acrylates having a polyoxyethylene chain with an alkoxy group at the molecular terminal.

(xiv) Polymerizable unsaturated monomers having a sulfonic acid group: such as 2-acrylamido-2-methylpropane sulfonic acid, 2-sulfoethyl (meth)acrylate, allyl sulfonic acid, 4-styrene sulfonic acid, and sodium salts and ammonium salts of these sulfonic acids.

(xv) Polymerizable unsaturated monomers having a phosphate group: such as acid phosphoxyethyl (meth)acrylate, acid phosphoxypropyl (meth)acrylate, acid phosphoxypoly(oxyethylene)glycol (meth)acrylate, and acid phosphoxypoly(oxypropylene)glycol (meth)acrylate.

(xvi) Polymerizable unsaturated monomers having a UV-absorbing functional group: such as 2-hydroxy-4(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-[2-hydroxy-5-[2-(methacryloyloxy)ethyl]phenyl]-2H-benzotriazole.

(xvii) Photostable polymerizable unsaturated monomers: such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xviii) Polymerizable unsaturated monomers having a carbonyl group: such as acrolein, diacetone acrylamide, diacetone methacrylamide, acetoacetoxy ethyl methacrylate, formylstyrol, and vinyl alkyl ketones having from 4 to 7 carbons (for example, vinyl methyl ketone, vinyl ethyl ketone, and vinyl butyl ketone).

(xix) Polymerizable unsaturated monomers having an acid anhydride group: such as maleic anhydride, itaconic anhydride, and citraconic anhydride.

In the present specification, a polymerizable unsaturated group means an unsaturated group that is radically polymerizable. Examples of such polymerizable unsaturated groups include a vinyl group and a (meth)acryloyl group.

In addition, in the present specification, "(meth)acrylate" means an acrylate or a methacrylate. "(meth)acrylic acid" means acrylic acid or methacrylic acid. In addition, "(meth) acryloyl" means acryloyl or methacryloyl. Furthermore, "(meth)acrylamide" means acrylamide or methacrylamide.

In producing the hydroxyl group- and carboxyl group-containing acrylic resin (A1), the proportion of the hydroxyl group-containing polymerizable unsaturated monomer (M-1) to be used is preferably from 1 to 50 mass %, more preferably from 2 to 40 mass %, and even more preferably from 3 to 30 mass %, based on the total amount of the monomer components.

From the viewpoints of the curability, chipping resistance, adhesion, hardness, finished appearance, glass adhesiveness, and the like of the resulting coating film, the hydroxyl group- and carboxyl group-containing acrylic resin (A1) preferably has a hydroxyl value from 1 to 150 mg KOH/g, more preferably from 2 to 120 mg KOH/g, and even more preferably from 5 to 100 mg KOH/g.

In producing the hydroxyl group- and carboxyl group-containing acrylic resin (A1), the proportion of the carboxyl group-containing polymerizable unsaturated monomer (M-2) to be used is preferably from 1 to 50 mass %, more preferably from 2 to 40 mass %, and even more preferably from 3 to 30 mass %, based on the total amount of the monomer components.

From the viewpoint of the storage stability of the coating material, the water resistance of the resulting coating film, and the like, the hydroxyl group- and carboxyl group-containing acrylic resin (A1) preferably has an acid value from 1 to 80 mg KOH/g, more preferably from 5 to 50 mg KOH/g, and even more preferably from 5 to 30 mg KOH/g.

When the aqueous coating material composition according to an embodiment of the present invention contains the hydroxyl group- and carboxyl group-containing acrylic resin (A1), the content of the hydroxyl group- and carboxyl group-containing acrylic resin (A1) is preferably from 2 to 70 mass %, more preferably from 5 to 50 mass %, and even more preferably from 10 to 40 mass %, based on the resin solids content amount in the aqueous coating material composition.

Further, the hydroxyl group- and carboxyl group-containing acrylic resin (A1) is preferably hydroxyl group- and carboxyl group-containing acrylic resin particles (A1') having a core-shell structure.

Hydroxyl Group- and Carboxyl Group-Containing Acrylic Resin Particles (A1') Having a Core-Shell Structure In the present invention, a "shell portion" of the hydroxyl group- and carboxyl group-containing acrylic resin particles (A1') having a core-shell structure" refers to a polymer layer present in the outermost layer of the resin particles, a "core portion" refers to a polymer layer of the inner layer of the resin particles excluding the shell portion, and "having a core-shell structure" means a structure having the core portion and the shell portion.

Note that hereinafter, the "hydroxyl group- and carboxyl group-containing acrylic resin particles (A1') having a core-shell structure" may be simply referred to as "hydroxyl group- and carboxyl group-containing acrylic resin particles (A1')".

The core-shell structure described above is typically a layer structure in which the core portion is completely covered by the shell portion. However, depending on the mass ratio and the like of the core portion and the shell portion, the amount of the monomer of the shell portion may be insufficient to form a layer structure. In such a case, it is not necessary to have a complete layer structure as described above, and the structure may be a structure in which a part of the core portion is covered by the shell portion.

The hydroxyl group- and carboxyl group-containing acrylic resin particles (A1') are typically acrylic resin particles in which each particle is composed of a core portion and a shell portion. The core portion is a copolymer (I) containing a polymerizable unsaturated monomer as a copolymerization component, while the shell portion is a copolymer (II) containing a polymerizable unsaturated monomer as a copolymerization component. The polymerizable unsaturated monomers can be an appropriate combination of the polymerizable unsaturated monomers (M-1) to (M-3) described above.

A copolymer crosslinked structure can be imparted by using the aforementioned polymerizable unsaturated monomer having two or more polymerizable unsaturated groups per molecule as the polymerizable unsaturated monomer above. When the polymerizable unsaturated monomer having two or more polymerizable unsaturated groups per molecule is used, the proportion thereof to be used can be appropriately determined depending on the degree of crosslinking of the copolymer. Usually, the proportion is preferably in a range approximately from 0.1 to 30 mass %, particularly approximately from 0.5 to 10 mass %, and more particularly approximately from 1 to 7 mass %, based on the total amount of the polymerizable unsaturated monomers (M-1) to (M-3).

The hydroxyl group- and carboxyl group-containing acrylic resin particles (A1') can be produced by subjecting a polymerizable unsaturated monomer mixture to emulsion-polymerization to prepare an emulsion of the core portion copolymer (I), adding a polymerizable unsaturated monomer mixture to the resulting emulsion, and further subjecting the resulting mixture to emulsion-polymerization to prepare the shell portion copolymer (II).

The emulsion-polymerization for preparing an emulsion of the core portion copolymer (I) can be carried out by a commonly-known method. For example, the emulsion-polymerization can be carried out by subjecting a polymerizable unsaturated monomer mixture to emulsion polymerization using a polymerization initiator and in the presence of an emulsifier.

Suitable examples of the emulsifier include an anionic emulsifier and a nonionic emulsifier.

Examples of the anionic emulsifier include sodium salts and ammonium salts of alkylsulfonic acids, alkylbenzene-sulfonic acids, alkylphosphoric acids, and the like. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate.

Alternatively, a polyoxyalkylene group-containing anionic emulsifier having, per molecule, an anionic group and a polyoxyalkylene group such as a polyoxyethylene group or a polyoxypropylene group may be used, or a reactive anionic emulsifier having, per molecule, an anionic group and a radically polymerizable unsaturated group may be used.

Examples of the reactive anionic emulsifier include sodium salts of sulfonic acid compounds having a radically polymerizable unsaturated group, such as an allyl group, a methallyl group, a (meth)acryloyl group, a propenyl group, and a butenyl group, and ammonium salts of such sulfonic acid compounds.

The emulsifier is preferably used in an amount in a range approximately from 0.1 to 15 mass %, particularly preferably approximately from 0.5 to 10 mass %, more particularly preferably approximately from 1 to 5 mass %, based on the total amount of all monomers used.

Examples of the polymerization initiator include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropylbenzene hydroperoxide; azo compounds, such as azobis(isobutyronitrile), azobis(2,4-dimethylvaleronitrile), azobis(2-methylpropionitrile), azobis(2-methylbutyronitrile), 4,4'-azobis(4-cyanobutanoic acid), dimethyl azobis(2-methylproprionate), azobis[2-methyl-N-(2-hydroxyethyl)-propionamide], and azobis {2-methyl-N-[2-(1-hydroxybutyl)]-propionamide}; and persulfate salts, such as potassium persulfate, ammonium persulfate, and sodium persulfate. These polymerization initiators can be used alone or in a combination of two or more types. Furthermore, as necessary, a reducing agent such as sugar, sodium formaldehyde sulfoxylate, or an iron complex may be used in combination with the polymerization initiator to form a redox initiator.

Usually, the polymerization initiator is preferably used in an amount in a range approximately from 0.1 to 5 mass %, particularly preferably approximately from 0.2 to 3 mass %, based on the total amount of all monomers used. The method of adding the polymerization initiator is not particularly limited, and can be appropriately selected according to a type, an amount, and the like of the polymerization initiator. For example, the polymerization initiator can be contained in a monomer mixture or an aqueous medium in advance, or can be added all at once or added dropwise at the time of polymerization.

The hydroxyl group- and carboxyl group-containing acrylic resin particles (A1') can be produced by adding a polymerizable unsaturated monomer mixture to the resulting emulsion of the core portion copolymer (I), and further subjecting the resulting mixture to polymerization to form the shell portion copolymer (II).

The monomer mixture for forming the shell portion copolymer (II) may appropriately contain components such as the polymerization initiator, a chain transfer agent, a reducing agent, and an emulsifier, when necessary. In addition, the monomer mixture, while can be added dropwise as is, is preferably added dropwise as a monomer emulsion after being dispersed in an aqueous medium. The particle size of the monomer emulsion in this case is not particularly limited.

Examples of the method for polymerizing the monomer mixture for forming the shell portion copolymer (II) include a method of adding, all at once or gradually and dropwise, the monomer mixture or an emulsion thereof to the emulsion of the core portion copolymer (I), and heating the mixture to an appropriate temperature while stirring.

The hydroxyl group- and carboxyl group-containing acrylic resin particles (A1') produced in this way have a multi-layer structure with the copolymer (I) serving as the core portion and the copolymer (II) serving as the shell portion.

When the aqueous coating material composition according to an embodiment of the present invention contains the hydroxyl group- and carboxyl group-containing acrylic resin particles (A1'), the content of the hydroxyl group- and carboxyl group-containing acrylic resin particles (A1') is preferably from 2 to 70 mass %, more preferably from 5 to 50 mass %, and even more preferably from 10 to 40 mass %, based on the resin solids content amount in the aqueous coating material composition.

Further, in preparing the hydroxyl group- and carboxyl group-containing acrylic resin particles (A1'), a step of supplying a polymerizable unsaturated monomer (one type or a mixture of two or more types) for forming another resin layer and carrying out emulsion polymerization can be added between the step of preparing the core portion copolymer (I) and the step of preparing the shell portion copolymer (II). In particular, a gradient polymer layer is preferably formed as an additional layer, and the resulting product is preferably hydroxyl group- and carboxyl group-containing acrylic resin particles (A1") having a core-shell structure and containing a gradient polymer layer.

Hydroxyl Group- and Carboxyl Group-Containing Acrylic Resin Particles (A1") Having a Core-Shell Structure and Containing a Gradient Polymer Layer In the present invention, the gradient polymer layer of the "hydroxyl group- and carboxyl group-containing acrylic resin particles (A1") having a core-shell structure and containing a gradient polymer layer" means a polymer layer having a layer structure in which the composition continuously changes (having a compositional gradient).

More specifically, the gradient polymer layer means a polymer layer having a compositional gradient in which the monomer (monomer mixture) composition continuously changes from monomer A (monomer mixture A) to monomer B (monomer mixture B), for example.

Note that hereinafter, the "hydroxyl group- and carboxyl group-containing acrylic resin particles (A1") having a core-shell structure and containing a gradient polymer layer" may be simply referred to as "hydroxyl group- and carboxyl group-containing acrylic resin particles (A1")".

The gradient polymer layer usually can be produced by a known polymerization method called power feed polymerization. Specifically, for example, when two types of monomers, monomer A (monomer mixture A) and monomer B (monomer mixture B), are subjected to a polymerization reaction, the gradient polymer layer can be produced by adding the monomer B (monomer mixture B) dropwise into a container containing the monomer A (monomer mixture A) and, at the same time, introducing the monomer A (monomer mixture A) into a reaction vessel to perform a polymerization reaction.

In the power feed polymerization, a gradient polymer layer having a desired compositional gradient can be formed by setting the synthesis conditions [such as the timing to start mixing the monomer A (monomer mixture A) and the monomer B (monomer mixture B), the speed of adding the monomer B (monomer mixture B) dropwise into the container containing the monomer A (monomer mixture A), the speed of introducing the monomer A (monomer mixture A) into the reaction vessel, and the like].

From the viewpoint of the water resistance of the resulting coating film, the proportion of the gradient polymer layer in the hydroxyl group- and carboxyl group-containing acrylic resin particles (A1") is preferably approximately from 20 to 80 mass %, particularly preferably approximately from 25 to 75 mass %, and more particularly preferably approximately from 30 to 70 mass %, based on the total amount of all copolymer components of the hydroxyl group- and carboxyl group-containing acrylic resin particles (A1").

From the viewpoints of the curability, chipping resistance, adhesion, finished appearance, glass adhesiveness, and the like of the resulting coating film, the hydroxyl group- and carboxyl group-containing acrylic resin particles (A1") preferably has a hydroxyl value from 1 to 150 mg KOH/g, more preferably from 2 to 120 mg KOH/g, and even more preferably from 5 to 100 mg KOH/g.

From the viewpoints of the water resistance and chipping resistance of the resulting coating film, the core portion of the hydroxyl group- and carboxyl group-containing acrylic resin particles (A1") preferably has a hydroxyl value from 0 to 150 mg KOH/g, more preferably from 5 to 120 mg KOH/g, and even more preferably from 10 to 100 mg KOH/g.

From the viewpoints of the water resistance, chipping resistance, and glass adhesiveness of the resulting coating film, the shell portion of the hydroxyl group- and carboxyl group-containing acrylic resin particles (A1") preferably has a hydroxyl value from 0 to 150 mg KOH/g, more preferably from 2 to 120 mg KOH/g, and even more preferably from 5 to 100 mg KOH/g.

From the viewpoints of the storage stability of the coating material, the water resistance of the resulting coating film, and the like, the hydroxyl group- and carboxyl group-containing acrylic resin particles (A1") preferably has an acid value from 1 to 80 mg KOH/g, more preferably from 5 to 50 mg KOH/g, and even more preferably from 5 to 30 mg KOH/g.

From the viewpoints of the manufacturing stability and storage stability of the coating material, the core portion of the hydroxyl group- and carboxyl group-containing acrylic resin particles (A1″) preferably has an acid value from 0 to 50 mg KOH/g, more preferably from 0 to 30 mg KOH/g, and even more preferably from 0 to 10 mg KOH/g.

From the viewpoints of the storage stability of the coating material and the water resistance of the resulting coating film, the shell portion of the hydroxyl group- and carboxyl group-containing acrylic resin particles (A1″) preferably has an acid value from 1 to 100 mg KOH/g, more preferably from 5 to 80 mg KOH/g, and even more preferably from 10 to 50 mg KOH/g.

From the viewpoints of the water resistance, chipping resistance, glass adhesiveness, and the like of the resulting coating film, the hydroxyl group- and carboxyl group-containing acrylic resin particles (A1″) preferably has a glass transition temperature from −20 to 100° C., more preferably from 0 to 100° C., and even more preferably from 20 to 100° C.

From the viewpoints of the water resistance, chipping resistance, and glass adhesiveness of the resulting coating film, the core portion of the hydroxyl group- and carboxyl group-containing acrylic resin particles (A1″) preferably has a glass transition temperature from −50 to 50° C., more preferably from −30 to 50° C., and even more preferably from 0 to 50° C.

From the viewpoint of the water resistance of the resulting coating film, the shell portion of the hydroxyl group- and carboxyl group-containing acrylic resin particles (A1″) preferably has a glass transition temperature from 0 to 120° C., more preferably from 20 to 100° C., and even more preferably from 30 to 100° C.

In the present specification, the glass transition temperature (Tg) is calculated based on the following equations.

$$1/Tg\ (K)=(W1/T1)+(W2/T2)+\ldots \quad (1)$$

$$Tg\ (^{\circ}C.)=Tg\ (K)-273 \quad (2)$$

In the equations, W1, W2, and so on are the mass fractions of the monomers used for copolymerization, and T1, T2, and so on are the Tg (K) of the homopolymers of the monomers.

Note that, T1, T2, and so on are values according to Polymer Hand Book (Second Edition, J. Brandup, E. H. Immergut, ed.) III, pp. 139-179. The glass transition temperature (Tg) used for cases where the Tg of the homopolymer of a monomer was unknown is assumed to be the static glass transition temperature, which is provided as follows. A sample is placed into a measuring cup of a differential scanning calorimeter "DSC-220U" (available from Seiko Instruments, Inc.), and vacuum suction is performed to completely remove the solvent; then, the change in heat quantity is measured in a range from −20° C. to +200° C. at a temperature increase rate of 3° C./min, and the change point of the initial baseline at the low-temperature end is recorded as the static glass transition temperature.

When the aqueous coating material composition according to an embodiment of the present invention contains the hydroxyl group- and carboxyl group-containing acrylic resin particles (A1″), the content of the hydroxyl group- and carboxyl group-containing acrylic resin particles (A1″) is preferably from 2 to 70 mass %, more preferably from 5 to 50 mass %, and even more preferably from 10 to 40 mass %, based on the resin solids content amount in the aqueous coating material composition.

Hydroxyl Group- and Carboxyl Group-Containing Polyester Resin (A2)

The hydroxyl group- and carboxyl group-containing polyester resin (A2) can be synthesized by an esterification reaction between a polybasic acid and a polyhydric alcohol according to a common method.

The polybasic acid is a compound having two or more carboxyl groups per molecule, and examples thereof include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having two or more hydroxyl groups per molecule, and examples thereof include: diols such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl-pentanediol, and hydrogenated bisphenol A; trihydric or higher polyol components such as trimethylolpropane, trimethylolethane, glycerin, and pentaerythritol; and hydroxy-carboxylic acids such as 2,2-dimethylolpropionic acid, 2,2-dimethylolbutanoic acid. 2,2-dimethylolpentanoic acid, 2,2-dimethylolhexanoic acid, and 2,2-dimethyloloctanoic acid.

Furthermore, α-olefin epoxides such as propylene oxide and butylene oxide, monoepoxy compounds such as "Cardura E10" (product name, a glycidyl ester of synthetic highly branched saturated fatty acid, available from Hexion Specialty Chemicals), and the like may be reacted with an acid to introduce these compounds into the polyester resin.

The carboxyl group may be introduced into the polyester resin by, for example, a method in which the reaction product of the aforementioned esterification reaction between a polybasic acid and a polyhydric alcohol is further reacted with a polybasic acid, such as trimellitic acid and trimellitic anhydride, or an anhydride thereof, or a method in which an acid anhydride is added to a hydroxyl group-containing polyester and subjected to half-esterification.

The hydroxyl group- and carboxyl group-containing polyester resin (A2) may also be a fatty acid-modified polyester resin modified with a (semi-) drying oil fatty acid, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, and dehydrated castor oil fatty acid. The degree of modification by these fatty acids is generally preferably up to 30 mass % in terms of oil length. The hydroxyl group- and carboxyl group-containing polyester resin (A2) may be partially reacted with a monobasic acid such as benzoic acid.

Furthermore, during or after the preparation thereof, the hydroxyl group- and carboxyl group-containing polyester resin (A2) can be modified with a fatty acid, a monoepoxy compound, a polyisocyanate compound, an acrylic resin, or the like.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid. A preferable example of the monoepoxy compound include "Cardura E10P" (product name, a glycidyl ester of a synthetic highly-branched saturated fatty acid, available from Hexion Inc.).

Moreover, examples of the polyisocyanate compound include: aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylene bis(cyclohexyl isocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent and higher-valent polyisocyanates such as lysine triisocyanate; adducts of each of these organic polyisocyanates with a polyhydric alcohol, a low molecular weight polyester resin, water, or the like; and cyclized polymers (for example, isocyanurate) and biuret-type adducts of each of these organic polyisocyanates. These polyisocyanate compounds can be used alone, or two or more types thereof can be mixed and used.

The method of modifying the hydroxyl group- and carboxyl group-containing polyester resin (A2) with an acrylic resin may be a known method, and examples of the method include a method of polymerizing a mixture of a polymerizable unsaturated group-containing polyester resin and a polymerizable unsaturated monomer, and a method of reacting a hydroxyl group- and carboxyl group-containing polyester resin and an acrylic resin with each other.

The hydroxyl group- and carboxyl group-containing polyester resin (A2) preferably has a hydroxyl value from 1 to 250 mg KOH/g, more preferably from 2 to 200 mg KOH/g, and even more preferably from 5 to 200 mg KOH/g.

The hydroxyl group- and carboxyl group-containing polyester resin (A2) preferably has an acid value from 1 to 150 mg KOH/g, more preferably from 2 to 100 mg KOH/g, and even more preferably from 2 to 50 mg KOH/g.

The hydroxyl group- and carboxyl group-containing polyester resin (A2) preferably has a weight-average molecular weight from 3000 to 100000, more preferably from 4000 to 50000, and even more preferably from 5000 to 30000.

Note that in the present specification, the average molecular weight is a value calculated from a chromatogram measured by a gel permeation chromatograph calibrated with the molecular weight of standard polystyrene. For the gel permeation chromatograph, a "HLC-8120 GPC" (available from Tosoh Corporation) has been used. The gel permeation chromatography was performed using four columns "TSKgel G-4000HXL", "TSKgel G-3000HXL", "TSKgel G-2500HXL", and "TSKgel G-2000HXL" (product names, all available from Tosoh Corporation) under conditions of a mobile phase of tetrahydrofuran, a measurement temperature of 40° C., a flow rate of 1 mL/min, and a detector of RI.

When the aqueous coating material composition according to an embodiment of the present invention contains the hydroxyl group- and carboxyl group-containing polyester resin (A2), the content of the hydroxyl group- and carboxyl group-containing polyester resin (A2) is preferably from 2 to 70 mass %, more preferably from 5 to 50 mass %, and even more preferably from 5 to 40 mass %, based on the resin solids content amount in the aqueous coating material composition.

Hydroxyl Group- and Carboxyl Group-Containing Polyurethane Resin (A3)

The hydroxyl group- and carboxyl group-containing polyurethane resin (A3) can be prepared by a common method, for example, by reacting a polyol with a polyisocyanate compound. After the reaction, chain extension may be carried out in the presence of a chain extender that is a low molecular weight compound having at least two active hydrogen atoms per molecule, such as a diol or a diamine. Furthermore, during or after the preparation thereof, the hydroxyl group- and carboxyl group-containing polyurethane resin (A3) can be modified with an acrylic resin or the like.

Examples of a carboxyl group-free polyol having a low molecular weight include dihydric alcohols such as ethylene glycol, diethylene glycol, propylene glycol, butylene glycol, and hexamethylene glycol; and trihydric alcohols such as trimethylolpropane, glycerin, and pentaerythritol. Examples of a carboxyl group-free polyol having a high molecular weight include a polyether polyol, a polyester polyol, an acrylic polyol, and an epoxy polyol. Examples of the polyether polyol include polyethylene glycol, polypropylene glycol, and polytetramethylene glycol. Examples of the polyester polyol include a polycondensation product of an alcohol such as the aforementioned dihydric alcohols, dipropylene glycol, 1,4-butanediol, 1,6-hexanediol, or neopentyl glycol and a dibasic acid such as adipic acid, azelaic acid, or sebacic acid; a lactone-based ring-opened polymer polyol such as polycaprolactone; and a polycarbonate polyol.

Examples of the carboxyl group-containing polyol include 2,2-dimethylolpropionic acid and 2,2-dimethylolbutanoic acid. In particular, 2,2-dimethylolpropionic acid is more preferable. When these compounds are used, a small amount of a solvent such as N-methylpyrrolidone may be used to speed up the reaction.

Examples of the polyisocyanate compound to be reacted with the polyol include: aliphatic polyisocyanates such as hexamethylene diisocyanate, trimethylhexamethylene diisocyanate, dimeric acid diisocyanate, and lysine diisocyanate, as well as biuret type adducts or isocyanurate ring adducts of these polyisocyanates; alicyclic diisocyanates such as isophorone diisocyanate, 4,4'-methylenebis(cyclohexylisocyanate), methylcyclohexane-2,4-(or 2,6-)diisocyanate, 1,3-(or 1,4-)di(isocyanatomethyl)cyclohexane, 1,4-cyclohexane diisocyanate, 1,3-cyclopentane diisocyanate, and 1,2-cyclohexane diisocyanate, as well as biuret type adducts or isocyanurate ring adducts of these polyisocyanates; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4-toluidine diisocyanate, 4,4'-diphenylether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone, and isopropylidenebis-(4-phenylisocyanate), as well as biuret type adducts or isocyanurate ring adducts of these polyisocyanates; polyisocyanates having at least three isocyanate groups per molecule such as triphenylmethane-4,4',4"-triisocyanate, 1,3,5-triisocyanatobenzene, 2,4,6-triisocyanatotoluene, and 4,4'-dimethyldiphenylmethane-2,2',5,5'-tetraisocyanate, as well as biuret type adducts or isocyanurate ring adducts of these polyisocyanate compounds.

Examples of the diol serving as the chain extender include ethylene glycol, 1,4-butanediol, 1,5-pentanediol, 3-methyl-1,5-pentanediol, and cyclohexanediol. Examples of the diamine serving as the chain extender include ethylenediamine, propylenediamine, xylylenediamine, and N-(2-hydroxyethyl)ethylenediamine.

The hydroxyl group- and carboxyl group-containing polyurethane resin (A3) preferably has a hydroxyl value in a range from 1 to 250 mg KOH/g, more preferably from 2 to 200 mg KOH/g, and even more preferably from 5 to 200 mg KOH/g.

From the viewpoints of the manufacturing stability and water resistance of the resulting coating film, the hydroxyl group- and carboxyl group-containing polyurethane resin (A3) preferably has an acid value from 1 to 100 mg KOH/g, more preferably from 2 to 50 mg KOH/g, and even more preferably from 2 to 30 mg KOH/g.

The hydroxyl group- and carboxyl group-containing polyurethane resin (A3) preferably has a weight-average molecular weight of 3000 or greater, more preferably 5000 or greater, and even more preferably 10000 or greater.

When the aqueous coating material composition according to an embodiment of the present invention contains the hydroxyl group- and carboxyl group-containing polyurethane resin (A3), the content of the hydroxyl group- and carboxyl group-containing polyurethane resin (A3) is preferably from 2 to 70 mass %, more preferably from 5 to 50 mass %, and even more preferably from 10 to 40 mass %, based on the resin solids content amount in the aqueous coating material composition.

Blocked Polyisocyanate Compound (B)

The blocked polyisocyanate compound (B) is a compound prepared by blocking the isocyanate groups of a polyisocyanate compound (b1) with a blocking agent (b2).

Polyisocyanate Compound (b1)

The polyisocyanate compound (b1) is a compound having at least two isocyanate groups per molecule, and examples thereof include aliphatic polyisocyanates, alicyclic polyisocyanates, aromatic-aliphatic polyisocyanates, aromatic polyisocyanates, derivatives of these polyisocyanates, and any combination of these polyisocyanates.

Examples of the aliphatic polyisocyanates include: aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include: alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (commonly known as isophorone diisocyanate), 4-methyl-1,3-cyclohexylene diisocyanate (commonly known as hydrogenated TDI), 2-methyl-1,3-cyclohexylene diisocyanate, 1,3- or 1,4-bis(isocyanatomethyl)cyclohexane (commonly known as hydrogenated xylylene diisocyanate) or its mixture, methylenebis(4,1-cyclohexanediyl) diisocyanate (commonly known as hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2,2,1)heptane, 2-(3-isocyanatopropyl)-2,6-di(isocyanatomethyl)-bicyclo(2,2,1)heptane, 3-(3-isocyanatopropyl)-2,5-di(isocyanatomethyl)-bicyclo(2,2,1)heptane, 5-(2-isocyanatoethyl)-2-isocyanatomethyl-3-(3-isocyanatopropyl)-bicyclo(2,2,1)heptane, 6-(2-isocyanatoethyl)-2-isocyanatomethyl-3-(3-isocyanatopropyl)-bicyclo(2,2,1)heptane, 5-(2-isocyanatoethyl)-2-isocyanatomethyl-2-(3-isocyanatopropyl)-bicyclo(2,2,1)-heptane, and 6-(2-isocyanatoethyl)-2-isocyanatomethyl-2-(3-isocyanatopropyl)-bicyclo(2,2,1)heptane.

Examples of the aromatic-aliphatic polyisocyanates include: aromatic-aliphatic diisocyanates, such as methylenebis(4,1-phenylene) diisocyanate (commonly known as MDI), 1,3- or 1,4-xylylene diisocyanate or its mixture, ω,ω'-diisocyanato-1,4-diethylbenzene, and 1,3- or 1,4-bis(1-isocyanato-1-methylethyl)benzene (commonly known as tetramethylxylylene diisocyanate) or its mixture; and aromatic-aliphatic triisocyanates, such as 1,3,5-triisocyanatomethylbenzene.

Examples of the aromatic polyisocyanates include: aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (commonly known as 2,4-TDI) or 2,6-tolylene diisocyanate (commonly known as 2,6-TDI) or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives include dimers, trimers, biuret, allophanate, uretdione, uretoimine, isocyanurates, oxadiazinetrione, and polymethylene polyphenyl polyisocyanates (crude MDI and polymeric MDI), and crude TDI of the polyisocyanates described above.

The polyisocyanate compound (b1) is preferably an aliphatic diisocyanate, an alicyclic diisocyanate, or a derivative thereof, because the resulting blocked polyisocyanate compound (B) is less likely to turn yellow when heated. In particular, from the viewpoint of improving the flexibility of the resulting coating film, the polyisocyanate compound (b1) is more preferably an aliphatic diisocyanate or a derivative thereof.

The polyisocyanate compound (b1) also includes a prepolymer produced by reacting an aliphatic polyisocyanate, an alicyclic polyisocyanate, an aromatic-aliphatic polyisocyanate, an aromatic polyisocyanate, a derivative of these polyisocyanates, or any combination of these polyisocyanates with a compound capable of reacting with these polyisocyanates under conditions in which isocyanate groups are excessive. An example of the compound capable of reacting with these polyisocyanates includes a compound having an active hydrogen group such as a hydroxyl group or an amino group, and specific examples include polyhydric alcohols, low molecular weight polyester resins, amines, and water.

The polyisocyanate compound (b1) also includes polymers of an isocyanate group-containing polymerizable unsaturated monomer or copolymers of the isocyanate group-containing polymerizable unsaturated monomer and a polymerizable unsaturated monomer other than the isocyanate group-containing polymerizable unsaturated monomer.

From the viewpoints of the reactivity of the resulting blocked polyisocyanate compound (B) and compatibility between the resulting blocked polyisocyanate compound (B) and other coating material components, the polyisocyanate compound (b1) may have a number-average molecular weight within a range preferably from 300 to 20000, more preferably from 400 to 8000, and even more preferably from 500 to 2000.

From the viewpoints of the reactivity of the resulting blocked polyisocyanate compound (B) and compatibility between the resulting blocked polyisocyanate compound (B) and other coating material components, the polyisocyanate compound (b1) preferably has an average number of isocyanate functional groups in a range from 2 to 100 per molecule. The average number of isocyanate functional groups is more preferably 3 or more from the viewpoint of improving the reactivity of the resulting blocked polyisocyanate compound (B). The average number of isocyanate functional groups is more preferably 20 or less from the viewpoint of preventing gelation during production of the blocked polyisocyanate compound (B).

Blocking Agent (b2)

Examples of the blocking agent (b2) that blocks the isocyanate groups in the polyisocyanate compound (b1) include an active methylene-based blocking agent, an alcohol-based blocking agent, a phenol-based blocking agent, an oxime-based blocking agent, an amine-based blocking agent, an acid-amide-based blocking agent, an imidazole-based blocking agent, a pyridine-based blocking agent, and a mercaptan-based blocking agent. These blocking agents can be used alone or in a combination of two or more types.

From the viewpoint of the low-temperature curability, preferably at least part of the blocking agent (b2) is an active methylene-based blocking agent, and more preferably the blocking agent (b2) is an active methylene-based blocking agent.

Examples of the active methylene-based blocking agent include: malonic acid diesters, such as dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl) malonate, methyl isopropyl malonate, ethyl isopropyl malonate, methyl n-butyl malonate, ethyl n-butyl malonate, methyl isobutyl malonate, ethyl isobutyl malonate, methyl sec butyl malonate, ethyl sec-butyl malonate, diphenyl malonate, and dibenzyl malonate; acetoacetic acid esters, such as methyl acetoacetate, ethyl acetoacetate, n-propyl acetoacetate, iso-propyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate, and benzyl acetoacetate; isobutyrylacetic acid esters, such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate, and benzyl isobutyrylacetate; and any combinations of the foregoing.

From the viewpoint of the smoothness and distinctness of image of the coating film formed by the aqueous coating material composition according to an embodiment of the invention, the active methylene-based blocking agent is preferably at least one compound selected from the group consisting of dimethyl malonate, diethyl malonate, diisopropyl malonate, methyl acetoacetate, ethyl acetoacetate, methyl isobutyryl acetate, and ethyl isobutyryl acetate.

The blocking reaction of the isocyanate groups in the polyisocyanate compound (b1) can optionally contain a reaction catalyst. Examples of the reaction catalyst include basic compounds such as metal hydroxides, metal alkoxides, metal carboxylates, metal acetylacetonates, onium salt hydroxides, onium carboxylates, active methylene compound metal salts, active methylene compound onium salts, aminosilanes, amines, and phosphines.

From the viewpoint of the low-temperature curability of the aqueous coating material composition according to an embodiment of the invention and water resistance of the resulting coating film, the blocked polyisocyanate compound (B) preferably contains a structure derived from a spacer (b3) having at least 2 isocyanate-reactive functional groups.

Spacer (b3)

The spacer (b3) is a compound having at least 2 isocyanate-reactive functional groups.

The functional groups are not limited as long as they are functional groups that are reactive with isocyanate groups. Examples of isocyanate-reactive functional groups include a hydroxyl group, an amino group, a carboxyl group, and a thiol group. In particular, the isocyanate-reactive functional groups is preferably a hydroxyl group or an amino group, and particularly preferably a hydroxyl group.

Therefore, the spacer (b3) is preferably a compound having at least two hydroxyl groups or a compound having at least two amino groups, and more preferably a compound having at least two hydroxyl groups.

Examples of the compound having at least two hydroxyl groups include: low-molecular-weight compounds, including dihydric alcohols such as ethylene glycol, diethylene glycol, propylene glycol, butylene glycol, and hexamethylene glycol, and trihydric alcohols such as trimethylolpropane, glycerin, and pentaerythritol; and high-molecular-weight compounds, such as polyether polyols, polyester polyols, acrylic polyols, and epoxy polyols. In particular, from the viewpoint of the water resistance and chipping resistance of the resulting coating film, the compound having at least two hydroxyl groups is preferably a polyether polyol.

The polyether polyol may be a commercially available product. Examples of commercially available products of the polyether polyol include "PEG #200", "PEG #300", "PEG #400", "PEG #600", "PEG #1000", "PEG #1500", "PEG #1540", "PEG #2000", "PEG #4000", and "PEG #6000" (all polyethylene glycols available from NOF Corp.), "SANNIX GP250", "SANNIX GP400", "SANNIX GP600", "SANNIX GP1000", "SANNIX GP1500", "SANNIX GP3000", and "SANNIX GP4000" (all polyoxypropylene glyceryl ethers available from Sanyo Chemical Industries, Ltd.), "SANNIX PP200", "SANNIX PP400", "SANNIX PP600", "SANNIX PP950", "SANNIX PP1, 000", "SANNIX PP1,200", "SANNIX PP2,000", "SANNIX PP3,000", and "SANNIX PP4,000" (all polyoxypropylene glycols available from Sanyo Chemical Industries, Ltd.), and "PTMG250", "PTMG650", "PTMG1000", "PTMG2000", "PTMG3000", and "PTMG4000" (all polyoxytetramethylene glycols available from Mitsubishi Chemical Corp.).

An example of the compound having at least two amino groups includes a polyetheramine.

The polyetheramine may be a commercially available product. Examples of commercially available products of the polyetheramine include "JEFFAMINE D-400", "JEFFAMINE D-2000", "JEFFAMINE D-4000", "JEFFAMINE ED-600", "JEFFAMINE ED-900", "JEFFAMINE ED-2003", "ELASTAMINE RT-1000", "JEFFAMINE T-403", "JEFFAMINE T-3000", and "JEFFAMINE T-5000", all available from Huntsman Corporation.

From the viewpoint of the low-temperature curability of the aqueous coating material composition according to an embodiment of the invention and the hardness, chipping resistance, and water resistance of the resulting coating film, the spacer (b3) preferably has a molecular weight in a range from 500 to 6000, more preferably in a range from 800 to 5000, and even more preferably in a range from 1000 to 4000.

From the viewpoint of the storage stability of the aqueous coating material composition according to an embodiment of the invention, the spacer (b3) preferably has from 2 to 3 functional groups, and more preferably 2 functional groups.

The polyisocyanate compound (b1) containing a structure derived from the spacer (b3) can be formed by reacting some of the isocyanate groups in the polyisocyanate compound (b1) with the spacer (b3). In this case, from the viewpoints of the storage stability of the aqueous coating material composition according to an embodiment of the present invention, the hardness and water resistance of the resulting coating film, and the manufacturing stability of the blocked polyisocyanate compound (B), the ratio of the polyisocyanate compound (b1) to the spacer (b3) is preferably in a range from 0.03 to 0.6 mol of active hydrogen in the spacer (b3) based on 1 mol of isocyanate groups in the polyisocyanate compound (b1). The blocked polyisocyanate compound (B) containing a structure derived from the spacer (b3) can be formed by blocking the polyisocyanate compound (b1) containing a structure derived from the spacer (b3).

From the viewpoints of the storage stability of the aqueous coating material composition according to an embodiment of the present invention, the blocked polyisocyanate compound (B) may contain a structure derived from a hydrophilic group-containing compound (b4) having one isocyanate-reactive functional group.

Hydrophilic Group-Containing Compound (b4)

The hydrophilic group-containing compound (b4) has one isocyanate-reactive functional group. Examples of the hydrophilic group-containing compound (b4) include nonionic hydrophilic group-containing compounds, anionic hydrophilic group-containing compounds, cationic hydrophilic group-containing compounds, and any combinations thereof. The hydrophilic group-containing compound (b4) is preferably a nonionic hydrophilic group-containing compound, because the blocking reaction of the isocyanate groups in the polyisocyanate compound (b1) by the blocking agent (b2) is less likely to be inhibited.

An example of the nonionic hydrophilic group-containing compound includes a compound having a polyoxyalkylene group. Examples of the polyoxyalkylene group include a polyoxyethylene group, a polyoxypropylene group, and a polyoxyethyleneoxypropylene group. From the viewpoint of the storage stability of the aqueous coating material composition according to an embodiment of the present invention, the nonionic hydrophilic group-containing compound preferably has a polyoxyethylene group.

From the viewpoints of the storage stability of the aqueous coating material composition according to an embodiment of the present invention and the water resistance of the resulting coating film, the compound having a polyoxyethylene group preferably has 3 or more, preferably from 5 to 100, and more preferably from 8 to 45 continuous polyoxyethylene groups, that is, a polyoxyethylene block.

The compound having a polyoxyethylene group may contain an oxyalkylene group other than an oxyethylene group in addition to the polyoxyethylene block. Examples of the oxyalkylene group other than an oxyethylene group include an oxypropylene group, an oxybutylene group, and an oxystyrene group.

From the viewpoint of the storage stability of the aqueous coating material composition according to an embodiment of the present invention, the molar ratio of the oxyethylene groups among the oxyalkylene groups in the compound having a polyoxyethylene group is preferably in a range from 20 to 100 mol %, and more preferably in a range from 50 to 100 mol %. When the molar ratio of the oxyethylene groups among the oxyalkylene groups is 20 mol % or greater, hydrophilicity is sufficiently imparted, and the storage stability of the aqueous coating material composition according to an embodiment of the present invention is improved.

From the viewpoints of the storage stability of the aqueous coating material composition according to an embodiment of the present invention and the water resistance of the resulting coating film, the nonionic hydrophilic group-containing compound preferably has a number-average molecular weight in a range from 200 to 2000. From the viewpoint of the storage stability of the aqueous coating material composition according to an embodiment of the present invention, the number-average molecular weight is more preferably 300 or greater, and even more preferably 400 or greater. From the viewpoint of the water resistance of the coating film formed by the aqueous coating material composition according to an embodiment of the present invention, the number-average molecular weight is more preferably 1500 or less, and even more preferably 1200 or less.

Examples of the nonionic hydrophilic group-containing compound include: polyethylene glycol monoalkyl ethers (also known as ω-alkoxypolyoxyethylenes) such as polyethylene glycol monomethyl ether and polyethylene glycol monoethyl ether; polypropyleneglycol monoalkyl ethers (also known as ω-alkoxypolyoxypropylenes) such as polypropyleneglycol monomethyl ether and polypropyleneglycol monoethyl ether; ω-alkoxypolyoxyethylene(oxypropylene)s such as ω-methoxypolyoxyethylene(oxypropylene) and ω-ethoxypolyoxyethylene(oxypropylene); polyethylene glycol(propylene glycol) monoalkyl ethers such as polyethylene glycol(propylene glycol) monomethyl ether and polyethylene glycol(propylene glycol) monoethyl ether; and any combinations of the foregoing.

The nonionic hydrophilic group-containing compound is preferably polyethylene glycol monomethyl ether or polyethylene glycol monoethyl ether, more preferably polyethylene glycol monomethyl ether.

In the present specification, "polyethylene glycol(propylene glycol)" means a copolymer of ethylene glycol and propylene glycol, and this term includes block copolymers and random copolymers.

Examples of commercially available products of the polyethylene glycol monomethyl ether include "UNIOX M-400", "UNIOX M-550", "UNIOX M-1000" and "UNIOX M-2000", all available from NOF Corporation.

The polyisocyanate compound (b1) containing a structure derived from the hydrophilic group-containing compound (b4) can be formed by reacting some of the isocyanate groups in the polyisocyanate compound (b1) with the hydrophilic group-containing compound (b4). In this case, from the viewpoints of the storage stability of the aqueous coating material composition according to an embodiment of the present invention, as well as the adhesion, smoothness, distinctness of image, water resistance, chipping resistance, and glass adhesiveness of the resulting coating film, the ratio of the polyisocyanate compound (b1) to the hydrophilic group-containing compound (b4) is preferably in a range from 0.03 to 0.6 mol of active hydrogen in the hydrophilic group-containing compound (b4) based on 1 mol of isocyanate groups in the polyisocyanate compound (b1). The blocked polyisocyanate compound (B) containing a structure derived from the hydrophilic group-containing compound (b4) can be formed by blocking the polyisocyanate compound (b1) containing a structure derived from the hydrophilic group-containing compound (b4).

In reacting the isocyanate groups in the polyisocyanate compound (b1) with the blocking agent (b2), the spacer (b3) and/or the hydrophilic group-containing compound (b4), the order of reaction is not limited.

Specific examples of the reaction method include: a method of reacting some of the isocyanate groups in the polyisocyanate compound (b1) with the spacer (b3) and/or the hydrophilic group-containing compound (b4), and then blocking the remaining isocyanate groups with the blocking agent (b2); a method of blocking some of the isocyanate groups in the polyisocyanate compound (b1) with the blocking agent (b2), and then reacting the remaining isocyanate groups with the spacer (b3) and/or the hydrophilic group-containing compound (b4); and a method of simultaneously reacting isocyanate groups in the polyisocyanate compound (b1) with the blocking agent (b2), the spacer (b3), and/or the hydrophilic group-containing compound (b4).

From the viewpoint of the manufacturing stability and the water resistance and hardness of the resulting coating film, the blocked polyisocyanate compound (B) preferably has a weight-average molecular weight in a range from 3000 to 200000, more preferably in a range from 10000 to 150000, and more preferably in a range from 30000 to 120000.

The content of the blocked polyisocyanate compound (B) is preferably from 2 to 70 mass %, more preferably from 5 to 50 mass %, and even more preferably from 10 to 40 mass %, based on the resin solids content amount in the aqueous coating material composition.

Polycarbodiimide Compound (C)

The polycarbodiimide compound (C) is a compound having at least two carbodiimide groups per molecule, and examples thereof include a compound produced by subjecting the isocyanate groups of an isocyanate group-containing compound to decarboxylation.

From the viewpoints of excellent storage stability, as well as forming a coating film demonstrating excellent coating film performance such as high hardness and water resistance and demonstrating good glass adhesiveness, the polycarbodiimide compound (C) is preferably a water-soluble or water-dispersible polycarbodiimide compound. The water-soluble or water-dispersible polycarbodiimide compound is not particularly limited as long as it can be stably dissolved or dispersed in an aqueous medium.

Specific examples of the water-soluble polycarbodiimide compound include "CARBODILITE SV-02", "CARBODILITE V-02", "CARBODILITE V-02-L2", and "CARBODILITE V-04" (all available from Nisshinbo Chemical, Inc., trade names). Examples of the water-dispersible polycarbodiimide compound include "CARBODILITE E-01", "CARBODILITE E-02", and "CARBODILITE E-05" (all available from Nisshinbo Chemical, Inc., trade names).

The content of the polycarbodiimide compound (C) is preferably from 1 to 20 mass %, more preferably from 2 to 15 mass %, and even more preferably from 3 to 10 mass %, based on the resin solids content amount in the aqueous coating material composition.

Basic Compound (D)

The basic compound (D) is a compound used for neutralizing the carboxyl groups in the hydroxyl group- and carboxyl group-containing resin (A) and for adjusting the pH of the aqueous coating material composition. Therefore, compounds that chemically react with other functional groups, such as the diamines serving as chain extenders according to the description of the hydroxyl- and carboxyl-containing polyurethane resin (A3), are excluded.

The content of the basic compound (D) can be an amount that keeps the pH of the aqueous coating material composition according to an embodiment of the present invention within a range from 8.0 to 11.5. The content of the basic compound (D) is preferably from 0.1 to 15 mass %, more preferably from 0.5 to 10 mass %, and even more preferably from 1 to 8 mass %, based on the resin solids content amount in the aqueous coating material composition.

In the present invention, the basic compound (D) includes (D1) the basic compound having an acid dissociation constant (PKa) in a range from 7.0 to 8.5 and a boiling point in a range from 100 to 200° C. The content of the basic compound (D1) is in a range from 30 to 100 mass % based on the mass of the basic compound (D).

Basic Compound (D1)

The basic compound (D1) has an acid dissociation constant (PKa) in a range from 7.0 to 8.5 and has a boiling point in a range from 100 to 200° C.

When the acid dissociation constant (PKa) is 7.0 or greater, the resulting aqueous coating material composition has excellent storage stability; meanwhile, when the acid dissociation constant (PKa) is 8.5 or less, the resulting aqueous coating material composition forms a coating film having excellent hardness and water resistance.

In particular, the acid dissociation constant (PKa) of the basic compound (D1) is preferably in a range from 7.2 to 8.2, and more preferably in a range from 7.3 to 7.8.

When the boiling point is 100° C. or greater, the resulting aqueous coating material composition has excellent storage stability; meanwhile, when the boiling point is 200° C. or less, the resulting aqueous coating material composition forms a coating film having excellent hardness and water resistance.

In particular, the boiling point of the basic compound (D1) is preferably in a range from 105 to 180° C., more preferably in a range from 110 to 160° C.

Examples of the basic compound (D1) include morpholine (PKa 8.4, boiling point 129° C.), allylmorpholine (PKa 7.1, boiling point 158° C.), N-methylmorpholine (PKa 7.4, boiling point 116° C.), N-ethylmorpholine (PKa 7.7, boiling point 139° C.), and triallylamine (PKa 8.3, boiling point 156° C.). These can be used alone or in a combination of two or more types.

From the viewpoints of the storage stability of the aqueous coating material composition according to an embodiment of the present invention and the hardness and water resistance of the resulting coating film, the basic compound (D1) is preferably N-methylmorpholine (PKa 7.4, boiling point 116° C.) or N-ethylmorpholine (PKa 7.7, boiling point 139° C.).

The content of the basic compound (D1) in the aqueous coating material composition according to an embodiment of the present invention is in a range from 30 to 100 mass % based on the mass of the basic compound (D).

When the content of the basic compound (D1) in the aqueous coating material composition according to an embodiment of the present invention is 30 mass % or greater, the resulting aqueous coating material composition has excellent storage stability and forms a coating film having excellent hardness, water resistance, and glass adhesiveness.

In particular, the content of the basic compound (D1) in the aqueous coating material composition according to an embodiment of the present invention is preferably in a range from 35 to 90 mass %, more preferably in a range from 35 to 80 mass %, based on the mass of the basic compound (D).

Examples of the basic compound (D) other than the basic compound (D1) include ammonia, triethylamine, triethanolamine, 2-(dimethylamino)ethanol, and diethylethanolamine.

Although it is unclear why the aqueous coating material composition according to an embodiment of the present invention has excellent storage stability and forms a coating film demonstrating good glass adhesiveness and excellent coating film performance such as high hardness and water resistance even when cured at a relatively low temperature, the reason is inferred as follows. Since the acid dissociation constant (PKa) of the basic compound (D1) is 7.0 or greater, the carboxyl groups of the hydroxyl group- and carboxyl group-containing resin (A) can be neutralized, resulting in good storage stability. Meanwhile, since the acid dissociation constant (PKa) of the basic compound (D1) is 8.5 or less, the reaction between the hydroxyl group- and carboxyl group-containing resin (A) and the blocked polyisocyanate compound (B) as well as the reaction between the hydroxyl group- and carboxyl group-containing resin (A) and the polycarbodiimide compound (C) are not inhibited, resulting in the formation of a coating film demonstrating excellent coating film performance and good glass adhesiveness. Further, since the boiling point of the basic compound (D1) is 100° C. or higher, a small amount of the basic compound (D1) volatilizes during storage of the aqueous coating material composition according to an embodiment of the present invention, which enables good storage stability. Meanwhile, since the boiling point of the basic compound (D1) is 200° C. or less, an increased amount of the basic compound (D1) volatilizes during heating and curing, and the reaction between the hydroxyl group- and carboxyl group-containing resin (A) and the blocked polyisocyanate compound (B) as well as the reaction between the hydroxyl group- and carboxyl group-containing resin (A) and the polycarbodiimide compound (C) are not inhibited, resulting in the formation of a coating film demonstrating excellent coating film performance and good glass adhesiveness. Moreover, by adjusting the pH of the aqueous coating material composition to a relatively high range from 8.0 to 11.5, the carboxyl groups of the hydroxyl group- and carboxyl group-containing resin (A) are neutralized, and thus the reaction of the carbodiimide compound (C) is suppressed, resulting in good storage stability.

Melamine Resin (E)

The aqueous coating material composition according to an embodiment of the present invention may further contain a melamine resin (E).

The melamine resin (E) may be a partially methylolated melamine resin or a fully methylolated melamine resin produced by reacting a melamine component with an aldehyde component. Examples of the aldehyde component include formaldehyde, paraformaldehyde, acetaldehyde, and benzaldehyde.

The melamine resin (E) may also be a compound produced by partially or fully etherifying methylol groups of the methylolated melamine resin with an appropriate alcohol. Examples of the alcohol used in the etherification include methyl alcohol, ethyl alcohol, n-propyl alcohol, i-propyl alcohol, n-butyl alcohol, i-butyl alcohol, 2-ethyl-1-butanol, and 2-ethyl-1-hexanol.

The melamine resin (E) is preferably a methyl-etherified melamine resin produced by partially or fully etherifying methylol groups of a partially or fully methylolated melamine resin with methyl alcohol, a butyl-etherified melamine resin produced by partially or fully etherifying methylol groups of a partially or fully methylolated melamine resin with butyl alcohol, or a methyl-butyl mixed etherified melamine resin produced by partially or fully etherifying methylol groups of a partially or fully methylolated melamine resin with methyl alcohol and butyl alcohol, and more preferably a methyl-butyl mixed etherified melamine resin.

The melamine resin (B) has a weight-average molecular weight of preferably from 400 to 6000, more preferably from 500 to 4000, and even more preferably from 600 to 3000.

The melamine resin (E) may be a commercially available product. Examples of the commercially available products are under the following product names: "CYMEL 202", "CYMEL 203", "CYMEL 204", "CYMEL 211", "CYMEL 212", "CYMEL 238", "CYMEL 251", "CYMEL 253", "CYMEL 254", "CYMEL 303", "CYMEL 323", "CYMEL 324", "CYMEL 325", "CYMEL 327", "CYMEL 350", "CYMEL 370", "CYMEL 380", "CYMEL 385", "CYMEL 1156", "CYMEL 1158", "CYMEL 1116", and "CYMEL 1130" (all available from Allnex Japan Inc.); "RESIMENE 735", "RESIMENE 740", "RESIMENE 741", "RESIMENE 745", "RESIMENE 746", and "RESIMENE 747" (all available from Monsanto Company); "U-VAN 120", "U-VAN 20HS", "U-VAN 20SE", "U-VAN 2021", "U-VAN 2028", and "U-VAN 28-60" (all available from Mitsui Chemicals, Inc.); and "SUMIMAL M55", "SUMIMAL M30W", and "SUMIMAL M50W" (all available from Sumitomo Chemical Co., Ltd.).

When the aqueous coating material composition according to an embodiment of the present invention contains the melamine resin (E), the content of the melamine resin (E) is preferably from 1 to 30 mass %, more preferably from 2 to 20 mass %, and even more preferably from 3 to 15 mass %, based on the resin solids content amount in the aqueous coating material composition.

Additional Component

The aqueous coating material composition according to an embodiment of the present invention may further contain, for example, a resin other than the resins described above, a pigment, an organic solvent, a curing catalyst, a dispersant, an antisettling agent, a defoaming agent, a thickener, an ultraviolet absorber, a photostabilizer, or a surface conditioner as necessary.

Examples of the resin other than the resins described above include hydroxyl group- and/or carboxyl group-free acrylic resins, hydroxyl group- and/or carboxyl group-free polyester resins, hydroxyl group- and/or carboxyl group-free polyurethane resins, hydroxyl group- and/or carboxyl group-free polyether resins, hydroxyl group- and/or carboxyl group-free polycarbonate resins, and hydroxyl group- and/or carboxyl group-free epoxy resins. In particular, the resin other than the resins described above is preferably a hydroxyl group-free carboxyl group-containing polyurethane resin.

The hydroxyl group-free carboxyl group-containing polyurethane resin can be prepared by a common method, for example, by reacting a polyol with a polyisocyanate. After the reaction, chain extension may be carried out in the presence of a chain extender that is a low molecular weight compound having at least two active hydrogen atoms per molecule, such as a diol or a diamine. Furthermore, during or after the preparation thereof, the hydroxyl group-free carboxyl group-containing polyurethane resin can be modified with an acrylic resin or the like.

The polyol, polyisocyanate, and chain extender may be the compounds included in the description of the hydroxyl group- and carboxyl group-containing polyurethane resin (A3).

Examples of the pigment include color pigments, extender pigments, and photoluminescent pigments. The pigments can be used alone or in combination of two or more.

When the aqueous coating material composition according to an embodiment of the present invention contains the pigment, the compounding amount of the pigment is preferably in a range from 1 to 200 parts by mass, more preferably in a range from 5 to 160 parts by mass, and even more preferably in a range from 15 to 140 parts by mass, based on 100 parts by mass of the resin solids content in the aqueous coating material composition according to an embodiment of the present invention.

Examples of the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments.

When the aqueous coating material composition according to an embodiment of the present invention contains the color pigment, the compounding amount of the color pigment is preferably in a range from 1 to 180 parts by mass, more preferably in a range from 5 to 150 parts by mass, and even more preferably in a range from 15 to 130 parts by mass, based on 100 parts by mass of the resin solids content in the aqueous coating material composition according to an embodiment of the present invention.

Examples of the extender pigment include barium sulfate, talc, clay, kaolin, barium carbonate, calcium carbonate, silica, and alumina white. The extender pigment is preferably barium sulfate from the viewpoint of improving designability and the like.

When the aqueous coating material composition according to an embodiment of the present invention contains the extender pigment, the compounding amount of the extender pigment is preferably in a range from 1 to 180 parts by mass, more preferably in a range from 5 to 140 parts by mass, and even more preferably in a range from 10 to 120 parts by mass, based on 100 parts by mass of the resin solids content in the aqueous coating material composition according to an embodiment of the present invention.

Examples of the photoluminescent pigment include aluminum (including vapor-deposited aluminum), copper, zinc, brass, nickel, glass flakes, aluminum oxide, mica, aluminum oxide coated with titanium oxide and/or iron oxide, and mica coated with titanium oxide and/or iron oxide. Among them, an aluminum pigment is preferably used. The aluminum pigment is classified into a non-leafing type aluminum pigment and a leafing type aluminum pigment, and any of them can be used.

The photoluminescent pigment is preferably a scale-shaped pigment. The photoluminescent pigment preferably has a longitudinal dimension in a range from 1 to 100 μm, particularly from 5 to 40 μm, and a thickness in a range from 0.001 to 5 μm, particularly from 0.01 to 2 μm.

When the aqueous coating material composition according to an embodiment of the present invention contains the photoluminescent pigment, the compounding amount of the photoluminescent pigment is preferably in a range from 0.1 to 100 parts by mass, more preferably in a range from 1 to 50 parts by mass, and even more preferably in a range from 3 to 25 parts by mass, based on 100 parts by mass of the resin solids content in the aqueous coating material composition according to an embodiment of the present invention.

Examples of the organic solvent include: ketone-based solvents, such as acetone, methyl ethyl ketone, and methyl isobutyl ketone; ester-based solvents, such as ethyl acetate, butyl acetate, methyl benzoate, ethyl ethoxypropionate, ethyl propionate, and methyl propionate; alcohol-based solvents, such as isopropanol, n-butanol, iso-butanol, and 2-ethylhexanol; ether-based solvents, such as tetrahydrofuran, dioxane, and dimethoxyethane; glycol ether-based solvents, such as ethylene glycol monomethyl ether, ethylene glycol monoethyl ether, diethylene glycol monomethyl ether, propylene glycol monomethyl ether acetate, and 3-methoxybutyl acetate; aromatic hydrocarbon-based solvents; and aliphatic hydrocarbon-based solvents.

Specific examples of the curing catalyst include: organometallic compounds such as tin octylate, dibutyltin diacetate, dibutyltin di(2-ethylhexanoate), dibutyltin dilaurate, dioctyltin diacetate, dioctyltin di(2-ethylhexanoate), dibutyltin oxide, dibutyltin sulfide, dioctyltin oxide, dibutyltin fatty acid salts, lead 2-ethylhexanoate, zinc octylate, zinc naphthenate, zinc fatty acids, bismuth octanoate, bismuth 2-ethylhexanoate, bismuth oleate, bismuth neodecanoate, bismuth versatate, bismuth naphthenate, cobalt naphthenate, calcium octylate, copper naphthenate, and tetra(2-ethylhexyl) titanate; sulfonic acid group-containing compounds such as para-toluenesulfonic acid, dodecylbenzenesulfonic acid, and dinonylnaphthalenesulfonic acid; and phosphate group-containing compounds such as monobutyl phosphate, dibutyl phosphate, mono-2-ethylhexyl phosphate, di-2-ethylhexyl phosphate, alkyl ether phosphate, polyoxyethylene alkyl ether phosphate, and phosphate group-containing resins. In particular, from the viewpoints of the storage stability of the aqueous coating material composition and the water resistance and chipping resistance of the resulting coating film, the curing catalyst is preferably a phosphate group-containing compound, more preferably a phosphate group-containing resin, and even more preferably a phosphate group-containing acrylic resin.

The phosphate group-containing acrylic resin can be synthesized by using a common method to copolymerize a polymerizable unsaturated monomer having a phosphate group with another polymerizable unsaturated monomer.

In the phosphate group-containing acrylic resin, the content of the polymerizable unsaturated monomer having a phosphate group is preferably from 1 to 50 mass %, particularly preferably from 5 to 40 mass %, based on the total amount of the monomer components constituting the phosphate group-containing acrylic resin.

From the viewpoints of the finished appearance and coating film performance, the phosphate group-containing acrylic resin preferably has a weight-average molecular weight preferably in a range from 3000 to 30000, more preferably in a range from 5000 to 25000, and even more preferably in a range from 10000 to 20000.

When the curing catalyst is a phosphate group-containing compound, the content of the phosphate group-containing compound is preferably from 0.1 to 20 mass %, more preferably from 0.5 to 15 mass %, and even more preferably from 1 to 10 mass %, based on the resin solids content in the aqueous coating material composition.

When the aqueous coating material composition is used in coating, water and/or an organic solvent or the like can be added to the aqueous coating material composition as necessary to dilute the aqueous coating material composition and adjust the viscosity to an appropriate level.

The appropriate level of viscosity varies depending on the composition of the coating material. For example, when the viscosity is adjusted using a Ford cup No. 4 viscometer, the viscosity can be usually approximately from 20 to 100 seconds, preferably approximately from 25 to 70 seconds, at 20° C.

The aqueous coating material composition according to an embodiment of the present invention usually has a solids content concentration at application approximately from 5 to 70 mass %, and preferably approximately from 10 to 55 mass %.

The aqueous coating composition of the present invention may be either a one-component coating material or a multi-component coating material, but is preferably a one-component coating material from the perspective of excellent productivity without a mixing process of coating materials, simplification of maintenance of a coating machine, and the like.

The aqueous coating material composition according to an embodiment of the present invention can be applied onto an object to be coated by a method known per se, such as air spraying, air-less spraying, rotary atomization coating, or curtain coating. Electrostatic application may also be performed during the application. In particular, air spraying and rotary atomization coating are preferable. Such a coating method can be carried out once or several times until a desired film thickness is achieved.

The application amount of the aqueous coating material composition according to an embodiment of the present invention can usually be an amount resulting in a cured film thickness from 5 to 40 μm, preferably from 7 to 35 μm, and more preferably from 10 to 30 μm.

Method for Forming Multilayer Coating Film

The aqueous coating material composition according to an embodiment of the present invention forms a coating film demonstrating good glass adhesiveness and excellent coating film performance such as high hardness and water resistance even when cured at a relatively low temperature. As such, the aqueous coating material composition according to an embodiment of the present invention can be suitably used as an intermediate coating material composition. The present coating material can be particularly suitably used as a coating material for automobiles.

A preferred example of a method for forming a multilayer coating film in which the present coating material serves as an intermediate coating material composition is the following method.

The method for forming a multilayer coating film includes, in sequence:

(1) applying the aqueous coating material composition according to an embodiment of the present invention onto an object to be coated to form an intermediate coating film;

(2) applying an aqueous basecoat coating material composition onto the intermediate coating film formed in (1) to form a basecoat coating film;

(3) applying a clear coating material composition onto the basecoat coating film formed in (2) to form a clear coating film; and (4) heating and curing, all at once at a temperature in a range from 60 to 110° C., the intermediate coating film formed in (1), the basecoat coating film formed in (2), and the clear coating film formed in (3).

Examples of the object to be coated include outer panel parts of automobile bodies such as passenger cars, trucks, motorcycles, and buses; automobile parts; outer panel parts of home electronics such as mobile phones and audio devices. In particular, outer panel parts of automobile bodies and automobile parts are preferred.

Materials of these objects to be coated are not particularly limited. Examples include metal materials, such as iron, aluminum, brass, copper, tin plates, stainless steel, galvanized steel, and zinc alloy (such as Zn—Al, Zn—Ni, and Zn—Fe)-plated steel; resins, such as polyethylene resins, polypropylene resins, acrylonitrile-butadiene-styrene (ABS) resins, polyamide resins, acrylic resins, vinylidene chloride resins, polycarbonate resins, polyurethane resins, and epoxy resins; plastic materials, such as various FRPs; inorganic materials, such as glass, cement, and concrete; woods; and fiber materials, such as paper and cloth. In particular, a metal material and a plastic material are preferred.

A surface of the object to be coated to which the coating film is applied may be a metal surface of, for example, outer panel parts of automobile bodies, automobile parts, home electronics, metal substrates such as steel sheets and the like constituting the foregoing, that has undergone surface treatment, such as phosphate salt treatment, chromate treatment, or composite oxide treatment.

A coating film may be further formed on an object that may or may not be surface-treated. For example, an object to be coated, which is a substrate, may be surface-treated as necessary, and an undercoating film may be formed on the treated surface. For example, in a case in which the object to be coated is an automobile body, the undercoating film can be formed using a coating material for undercoating that is known per se and that is typically used in automobile body coating.

For example, an electrodeposition paint, preferably a cationic electrodeposition paint, can be used as the undercoating paint to form the undercoating film.

The aqueous basecoat coating composition may be a coating material prepared using: a base resin, such as an acrylic resin, a polyester resin, an alkyd resin, a urethane resin, or an epoxy resin having a cross-linking functional group such as a carboxyl group or a hydroxyl group; a cross linking agent, for example, an amino resin such as a melamine resin or a urea resin, or a polyisocyanate compound that may be blocked; and a pigment, a thickener, and an optional additional component.

The clear coating material composition may be any thermosetting clear coating material composition that is known to be used in automobile body coating. Examples of the thermosetting clear coating composition include: organic solvent-type thermosetting coating compositions containing a base resin having a cross-linking functional group and a curing agent; aqueous thermosetting coating compositions; and powder thermosetting coating compositions.

Examples of the cross-linking functional group contained in the base resin include a carboxyl group, a hydroxyl group, an epoxy group, and a silanol group. Examples of the type of the base resin include acrylic resins, polyester resins, alkyd resins, urethane resins, epoxy resins, and fluororesins. Examples of the curing agent include polyisocyanate compounds, blocked polyisocyanate compounds, melamine resins, urea resins, carboxyl group-containing compounds, carboxyl group-containing resins, epoxy group-containing resins, and epoxy group-containing compounds.

The combination of the base resin/the curing agent in the clear coating material composition is preferably a hydroxyl group-containing resin/a polyisocyanate compound, a carboxyl group-containing resin/an epoxy group-containing resin, a hydroxyl group-containing resin/a blocked polyisocyanate compound, or a hydroxyl group-containing resin/a melamine resin, and more preferably a hydroxyl group-containing resin/a polyisocyanate compound.

In addition, the clear coating material composition may be a one-component coating material or a multi-component coating material, such as a two-component urethane resin coating material.

Furthermore, the clear coating material composition may include, as necessary and in a range in which transparency is not interfered with, a color pigment, a photoluminescent pigment, a dye, or the like, and may further include, as appropriate, an extender pigment, an ultraviolet absorber, a photostabilizer, a defoaming agent, a thickener, a rust inhibitor, a surface conditioner, and the like.

The method for applying the clear coating material composition is not limited, and a wet coating film may be formed by an application method such as air spraying, airless spraying, rotary atomization coating, or curtain coating. In these application methods, an electrostatic voltage may be applied as necessary. In particular, air spraying or rotary atomization coating is particularly preferable. The application amount of the clear coating material composition can usually be an amount resulting in a cured film thickness from 10 to 70 μm, preferably from 20 to 50 μm.

In a case in which air spraying, airless spraying, and rotary atomization coating are carried out, a solvent such as an organic solvent is preferably used to appropriately adjust the viscosity of the clear coating material composition to a viscosity range suitable for the application, which is usually a viscosity range approximately from 15 to 60 seconds, particularly approximately from 20 to 50 seconds at 20° C. as measured with a Ford cup No. 4 viscometer.

The heating can be performed by known means, and for example, a drying furnace such as a hot air furnace, an electric furnace, or an infrared induction heating furnace can be suitably used. The heating temperature is in a range from 60 to 110° C. preferably from 70 to 90° C. The heating time is not limited, but is preferably in a range from 10 to 40 minutes, more preferably from 20 to 40 minutes.

EXAMPLES

The present invention will be described more specifically below through production examples, examples and comparative examples. These production examples, examples, and comparative examples are merely exemplary and are not intended to limit the scope of the present invention. In the production examples, examples, and comparative examples, "parts" and "%" are in mass basis unless otherwise specified. In addition, the film thickness of the coating film is based on a cured coating film.

Production of Hydroxyl Group- and Carboxyl Group-Containing Resin (A)
Production of Hydroxyl Group- and Carboxyl Group-Containing Acrylic Resin Particles (A1') Having a Core-Shell Structure Production Example 1

A reaction vessel equipped with a thermometer, a thermostat, a stirrer, a reflux condenser, a nitrogen introduction tube, and a dripping device was charged with 130 parts of deionized water and 0.52 parts of "AQUALON KH-10" (product name, available from DKS Co. Ltd., an emulsifier having 97% of active ingredient). Then, the content was mixed by stirring in a nitrogen stream, and the temperature was raised to 80° C.

Then, 1.72 parts of monomer emulsion (1) described below and 5.3 parts of a 6% ammonium persulfate aqueous solution were introduced into the reaction vessel, and the reaction vessel was maintained at 80° C. for 15 minutes. The remaining monomer emulsion (1) was added dropwise over 3 hours into the reaction vessel maintained at the temperature specified above. After completion of the dropwise addition, the mixture was aged for 1 hour. Then, monomer emulsion (2) described below was added dropwise over 1 hour, and the mixture was aged for 1 hour. Next, while 20 parts of a 5% N-ethylmorpholine aqueous solution was gradually added to the reaction vessel, the mixture was cooled to 30° C. The mixture was discharged while being filtered with a 100-mesh nylon cloth, resulting in hydroxyl group- and carboxyl group-containing acrylic resin particles (A1'-1) having a solids content concentration of 30%. The resulting hydroxyl group- and carboxyl group-containing acrylic resin particles (A1'-1) had an acid value of 16 mg KOH/g, a hydroxyl value of 66 mg KOH/g, and a glass transition temperature of 21° C.

Monomer emulsion (1): produced by mixing and stirring 42 parts of deionized water, 0.72 parts of "AQUALON KH-10". 2 parts of methylenebisacrylamide, 5 parts of styrene, 15 parts of methyl methacrylate, 5 parts of 2-hydroxyethyl methacrylate, and 23 parts of n-butyl acrylate.

Monomer emulsion (2): produced by mixing and stirring 42 parts of deionized water, 0.72 parts of "AQUALON KH-10". 0.05 parts of ammonium persulfate, 2.5 parts of methacrylic acid, 10 parts of 2-hydroxyethyl methacrylate, 5 parts of styrene, 12.5 parts of methyl methacrylate, 10 parts of n-butyl acrylate, and 10 parts of n-butyl methacrylate.

Production Example 2

A reaction vessel equipped with a thermometer, a thermostat, a stirrer, a reflux condenser, a nitrogen introduction tube, and a dripping device was charged with 130 parts of deionized water and 0.52 parts of "AQUALON KH-10" (product name, available from DKS Co. Ltd., an emulsifier having 97% of active ingredient). Then, the content was mixed by stirring in a nitrogen stream, and the temperature was raised to 80° C.

Then, 1.72 parts of monomer emulsion (1) described below and 5.3 parts of a 6% ammonium persulfate aqueous solution were introduced into the reaction vessel, and the reaction vessel was maintained at 80° C. for 15 minutes. The remaining monomer emulsion (1) was added dropwise over 3 hours into the reaction vessel maintained at the temperature specified above. After completion of the dropwise addition, the mixture was aged for 1 hour. Then, monomer emulsion (2) described below was added dropwise over 1 hour, and the mixture was aged for 1 hour. Next, while 20 parts of a 5%2-(dimethylamino)ethanol aqueous solution was gradually added to the reaction vessel, the mixture was cooled to 30° C. The mixture was discharged while being filtered with a 100-mesh nylon cloth, resulting in hydroxyl group- and carboxyl group-containing acrylic resin particles (A1'-2) having a solids content concentration of 30%. The resulting hydroxyl group- and carboxyl group-containing acrylic resin particles (A1'-2) had an acid value of 16 mg KOH/g, a hydroxyl value of 66 mg KOH/g, and a glass transition temperature of 21° C.

Monomer emulsion (1): produced by mixing and stirring 42 parts of deionized water, 0.72 parts of "AQUALON KH-10", 2 parts of methylenebisacrylamide, 5 parts of styrene, 15 parts of methyl methacrylate, 5 parts of 2-hydroxyethyl methacrylate, and 23 parts of n-butyl acrylate.

Monomer emulsion (2): produced by mixing and stirring 42 parts of deionized water, 0.72 parts of "AQUALON KH-10", 0.05 parts of ammonium persulfate, 2.5 parts of methacrylic acid, 10 parts of 2-hydroxyethyl methacrylate, 5 parts of styrene, 12.5 parts of methyl methacrylate, 10 parts of n-butyl acrylate, and 10 parts of n-butyl methacrylate. Production of Hydroxyl Group- and Carboxyl Group-Containing Acrylic Resin Particles (A1") Having a Core-Shell Structure and Containing a Gradient Polymer Layer

Production Example 3

A reaction vessel equipped with a thermometer, a thermostat, a stirrer, a reflux condenser, a nitrogen introduction tube, and a dripping device was charged with 130 parts of deionized water and 0.52 parts of "AQUALON KH-10" (product name, available from DKS Co. Ltd., an emulsifier having 97% of active ingredient). Then, the content was mixed by stirring in a nitrogen stream, and the temperature was raised to 80° C.

Then, 1.72 parts of monomer emulsion (1) described below and 5.3 parts of a 6% ammonium persulfate aqueous solution were introduced into the reaction vessel, and the reaction vessel was maintained at 80° C. for 15 minutes. Thereafter, 35.4 parts of the monomer emulsion (1) was added dropwise over 1 hour into the reaction vessel maintained at the temperature specified above. Immediately after the completion of the dropwise addition, 55.6 parts of the remaining monomer emulsion (1) was added dropwise to the reaction vessel. At the same time, 55.6 parts of the monomer emulsion (2) was added dropwise to the monomer emulsion (1), and the dropwise addition of the monomer emulsion (1) and the monomer emulsion (2) was completed over 2 hours. Then, 37.17 parts of the remaining monomer emulsion (2) was added dropwise to the reaction vessel over 1 hour, and the mixture was aged for 1 hour. Next, while 20 parts of a 5% N-ethylmorpholine aqueous solution was gradually added to the reaction vessel, the mixture was cooled to 30° C. The mixture was then discharged while being filtered with a 100-mesh nylon cloth, resulting in hydroxyl group- and carboxyl group-containing acrylic resin particles (A1"-1) having a solids content concentration of 30%. The resulting hydroxyl group- and carboxyl group-containing acrylic resin particles (A1"-1) had an acid value of 16 mg KOH/g, a hydroxyl value of 66 mg KOH/g, and a glass transition temperature of 21° C.

Monomer emulsion (1): produced by mixing and stirring 42 parts of deionized water, 0.72 parts of "AQUALON KH-10". 2 parts of methylenebisacrylamide, 5 parts of styrene, 15 parts of methyl methacrylate, 5 parts of 2-hydroxyethyl methacrylate, and 23 parts of n-butyl acrylate.

Monomer emulsion (2): produced by mixing and stirring 42 parts of deionized water, 0.72 parts of "AQUALON KH-10". 0.05 parts of ammonium persulfate, 2.5 parts of methacrylic acid, 10 parts of 2-hydroxyethyl methacrylate, 5 parts of styrene, 12.5 parts of methyl methacrylate, 10 parts of n-butyl acrylate, and 10 parts of n-butyl methacrylate. Production of Hydroxyl Group- and Carboxyl Group-Containing Polyester Resin (A2)

Production Example 4

A reaction vessel equipped with a thermometer, a thermostat, a stirrer, a reflux condenser, and a water separator was charged with 174 parts of trimethylolpropane, 327 parts of neopentyl glycol, 352 parts of adipic acid. 109 parts of isophthalic acid, and 101 parts of 1,2-cyclohexane dicarboxylic anhydride, and the temperature was raised from 160° C. to 230° C. over 3 hours. Then, while produced condensed water was distilled off with the water separator, the temperature was maintained at 230° C., and the mixture was reacted until the acid value reached 3 mg KOH/g or less. 59 parts of trimellitic anhydride was added to the reaction product, and addition reaction was performed at 170° C. for 30 minutes. Then, the mixture was cooled to 50° C. or lower, and 75.8 parts of N-ethylmorpholine was added to neutralize the mixture. Then, deionized water was gradually added, resulting in a hydroxyl group- and carboxyl group-containing polyester resin solution (A2-1) having a solids content concentration of 45%. The resulting hydroxyl group- and carboxyl group-containing polyester resin had a hydroxyl value of 128 mg KOH/g, an acid value of 35 mg KOH/g, and a weight-average molecular weight of 13000.

Production Example 5

A reaction vessel equipped with a thermometer, a thermostat, a stirrer, a reflux condenser, and a water separator was charged with 174 parts of trimethylolpropane, 327 parts of neopentyl glycol, 352 parts of adipic acid, 109 parts of isophthalic acid, and 101 parts of 1,2-cyclohexane dicarboxylic anhydride, and the temperature was raised from 160° C. to 230° C. over 3 hours. Then, while produced condensed water was distilled off with the water separator, the temperature was maintained at 230° C., and the mixture was reacted until the acid value reached 3 mg KOH/g or less. 59 parts of trimellitic anhydride was added to the reaction product, and addition reaction was performed at 170° C. for 30 minutes. Then, the mixture was cooled to 50° C. or lower, and 58.7 parts of 2-(dimethylamino)ethanol was added to neutralize the mixture. Then, deionized water was gradually added, resulting in a hydroxyl group- and carboxyl group-containing polyester resin solution (A2-2) having a solids content concentration of 45%. The resulting hydroxyl group- and carboxyl group-containing polyester resin had a hydroxyl value of 128 mg KOH/g, an acid value of 35 mg KOH/g, and a weight-average molecular weight of 13000. Production of Hydroxyl Group- and Carboxyl Group-Containing Polyurethane Resin (A3)

Production Example 6

A reactor equipped with a thermometer, a stirrer, and a reflux condenser was charged with 211.9 parts of polytetramethylene glycol (having a number-average molecular weight of 1000), 11.5 parts of 2,2-dimethylolpropionic acid, 6.9 parts of trimethylolpropane, 112.2 parts of isophorone diisocyanate, and 298.5 parts of methyl ethyl ketone, and the reaction system was purged with nitrogen gas. Then, the mixture was reacted at 80° C. with being stirred, resulting in an NCO-terminated urethane prepolymer having a free isocyanate group content of 3.2%. The resulting methyl ethyl ketone solution was cooled to 40° C. and emulsified by adding 493.2 g of deionized water containing 9.8 parts of N-ethylmorpholine. Next. 275.9 parts of a 5% N-(2-hydroxyethyl)ethylenediamine aqueous solution was added to the emulsified solution, and stirring was performed for 60 minutes. The resulting product was then subjected to heating under reduced pressure to evaporate methyl ethyl ketone, and the concentration of the resulting product was adjusted with deionized water, resulting in a hydroxyl group- and carboxyl group-containing polyurethane resin dispersion liquid (A3-1) having a solids content of 35%, an acid value of 14 mg KOH/g, a hydroxyl value of 12 mg KOH/g, and an average particle size of 120 nm.

Production Example 7

A reactor equipped with a thermometer, a stirrer, and a reflux condenser was charged with 211.9 parts of polytetramethylene glycol (having a number-average molecular weight of 1000), 11.5 parts of 2,2-dimethylolpropionic acid, 6.9 parts of trimethylolpropane, 112.2 parts of isophorone diisocyanate, and 298.5 parts of methyl ethyl ketone, and the reaction system was purged with nitrogen gas. Then, the mixture was reacted at 80° C. with being stirred, resulting in an NCO-terminated urethane prepolymer having a free isocyanate group content of 3.2%. The resulting methyl ethyl ketone solution was cooled to 40° C. and emulsified by adding 493.2 g of deionized water containing 8.6 parts triethylamine. Next, 275.9 parts of a 5% N-(2-hydroxyethyl) ethylenediamine aqueous solution was added to the emulsified solution, and stirring was performed for 60 minutes. The resulting product was then subjected to heating under reduced pressure to evaporate methyl ethyl ketone, and the concentration of the resulting product was adjusted with deionized water, resulting in a hydroxyl group- and carboxyl group-containing polyurethane resin dispersion liquid (A3-2) having a solids content of 35%, an acid value of 14 mg KOH/g, a hydroxyl value of 12 mg KOH/g, and an average particle size of 120 nm.

Production of Hydroxyl Group-Free Carboxyl Group-Containing Polyurethane Resin (U-1)

Production Example 8

A reactor equipped with a thermometer, a stirrer, and a reflux condenser was charged with 211.9 parts of polytetramethylene glycol (having a number-average molecular weight of 1000), 11.5 parts of 2,2-dimethylolpropionic acid, 6.9 parts of trimethylolpropane, 112.2 parts of isophorone diisocyanate, and 298.5 parts of methyl ethyl ketone, and the reaction system was purged with nitrogen gas. Then, the mixture was reacted at 80° C. with being stirred, resulting in an NCO-terminated urethane prepolymer having a free isocyanate group content of 3.2%. The resulting methyl ethyl ketone solution was cooled to 40° C. and emulsified by adding 493.2 g of deionized water containing 9.8 parts of N-ethylmorpholine. Next, 159.2 parts of a 5% ethylenediamine aqueous solution was added to the emulsified solution, and stirring was performed for 60 minutes. The resulting product was then subjected to heating under reduced pressure to evaporate methyl ethyl ketone, and the concentration of the resulting product was adjusted with deionized water, resulting in a hydroxyl group-free carboxyl group-containing polyurethane resin dispersion liquid (U-1) having a solids content of 35%, an acid value of 14 mg KOH/g, and an average particle size of 120 nm.

Production of Blocked Polyisocyanate Compound (B)

Production Example 9

A reaction vessel equipped with a thermometer, a thermostat, a stirrer, a reflux condenser, a nitrogen introduction tube, a dropping device, and a simple trap for the removed solvent was charged with 1500 parts of "Sumidur N-3300" (product name, available from Sumika Bayer Urethane Co., Ltd., a polyisocyanate containing isocyanurate structure derived from hexamethylene diisocyanate, solids content: 100%, isocyanate group content: 21.8%) and 0.9 parts of 2,6-di-t-butyl-4-methylphenol. The content was mixed well and heated at 130° C. for 3 hours under a nitrogen stream. Next. 1200 parts of ethyl acetate and 1300 parts of diisopropyl malonate were placed in the reaction vessel, and 14 parts of a 28% methanol solution of sodium methoxide were added while stirring was performed under a nitrogen stream. The mixture was stirred at 65° C. for 8 hours, resulting in a blocked polyisocyanate compound (B-1) having a solids content of 70% and a weight-average molecular weight of 4000.

Production Example 10

A reaction vessel equipped with a thermometer, a thermostat, a stirrer, a reflux condenser, a nitrogen introduction tube, and a dropping device was charged with 1610 parts of "Sumidur N-3300" (product name, available from Sumika Bayer Urethane Co., Ltd., a polyisocyanate containing isocyanurate structure derived from hexamethylene diisocyanate, solids content: 100%, isocyanate group content: 21.8%), 1200 parts of "PTMG2000" (product name, available from Mitsubishi Chemical Corporation, a polytetramethylene ether glycol, average molecular weight: 2000, solids content: 100%), and 0.9 parts of 2,6-di-t-butyl-4-methylphenol. The content was mixed well and heated at 130° C. for 3 hours under a nitrogen stream. Next. 1200 parts of ethyl acetate and 1250 parts of diisopropyl malonate were placed in the reaction vessel, and 14 parts of a 28% methanol solution of sodium methoxide were added while stirring was performed under a nitrogen stream. The mixture was stirred at 65° C. for 8 hours and diluted with ethyl acetate to a final solids content of 70%, resulting in a blocked polyisocyanate compound (B-2) having a solids content of 70% and a weight-average molecular weight of 50000.

Production of Phosphate Group-Containing Acrylic Resin

Production Example 11

A reaction vessel equipped with a thermometer, a thermostat, a stirrer, a reflux condenser, and a dropping device was charged with a mixed solvent of 27.5 parts of methoxypropanol and 27.5 parts of isobutanol, and heated to 110° C. Then, 121.5 parts of a mixture composed of 25 parts of styrene, 27.5 parts of n-butyl methacrylate. 20 parts of "isostearyl acrylate" (product name, available from Osaka Organic Chemical Industry Ltd., a branched higher alkyl acrylate), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of t-butyl peroxyoctanoate was added to the mixed solvent over 4 hours, and a mixture composed of 0.5 parts of t-butyl peroxyoctanoate and 20 parts of isopropanol was further added dropwise over one hour. Then, aging was performed under stirring for one hour, resulting in a phosphate group-containing acrylic resin solution (C1'-1) having a solids content concentration of 50%. The acid value due to the phosphate group of the resin was 83 mg KOH/g, the hydroxyl value was 29 mg KOH/g, and the weight average molecular weight was 10000.

A phosphate-containing polymerizable monomer: A reaction vessel equipped with a thermometer, a thermostat, a stirrer, a reflux condenser, and a dripping device was charged with 57.5 parts of monobutyl phosphate and 41 parts of isobutanol, and the temperature was raised to 90° C. Then, 42.5 parts of glycidyl methacrylate was added dropwise over 2 hours, and then the mixture was aged by stirring for another one hour. Subsequently, 59 parts of isopropanol were added, resulting in a phosphate group-containing polymerizable monomer solution having a solid content concentration of 50%. The acid value due to the phosphate group of the resulting monomer was 285 mg KOH/g.

Production of Pigment Dispersion Liquid

Production Example 12

44.4 parts of the hydroxyl group- and carboxyl group-containing polyester resin solution (A2-1) produced in Production Example 4 (solids content: 20 parts), 100 parts of "JR-806" (product name, available from Tayca Corporation, a rutile-type titanium dioxide), 1 part of "Carbon MA-100" (product name, available from Mitsubishi Chemical Corporation, a carbon black), and 10 parts of deionized water were mixed. Then, 1.2 parts of N-ethylmorpholine was added to the mixture to adjust the pH to 8.0. The resulting mixed solution was then placed in a wide-mouth glass bottle. Glass beads with a diameter of approximately 1.3 mmφ were added as dispersion media, and the wide-mouth glass bottle was sealed. The content was dispersed with a paint shaker for 30 minutes, resulting in a pigment dispersion liquid (P-1).

Production Example 13

44.4 parts of the hydroxyl group- and carboxyl group-containing polyester resin solution (A2-2) produced in Production Example 5 (solids content: 20 parts), 100 parts of "JR-806" (product name, available from Tayca Corporation, a rutile-type titanium dioxide), 1 part of "Carbon MA-100" (product name, available from Mitsubishi Chemical Corporation, a carbon black), and 10 parts of deionized water were mixed. Then, 0.7 parts of 2-(dimethylamino)ethanol was added to the mixture to adjust the pH to 8.0. The resulting mixed solution was then placed in a wide-mouth glass bottle. Glass beads with a diameter of approximately 1.3 mmφ were added as dispersion media, and the wide-mouth glass bottle was sealed. The content was dispersed with a paint shaker for 30 minutes, resulting in a pigment dispersion liquid (P-2).

Production of Aqueous Coating Material Composition

Example 1

155.9 parts of the pigment dispersion liquid (P-1) produced in Production Example 12, 83.3 parts of the hydroxyl group- and carboxyl group-containing acrylic resin particles (A1'-1) produced in Production Example 1 (solids content: 25 parts), 57.1 parts of the hydroxyl group- and carboxyl group-containing polyurethane resin dispersion liquid (A3-1) produced in Production Example 6 (solids content: 20 parts), 42.9 parts of the blocked polyisocyanate compound (B-1) produced in Production Example 9 (solids content: 30 parts), 12.5 parts of "Carbodilite SV02" (product name, available from Nisshinbo Chemical, Inc., a carbodiimide compound, solids content: 40%, carbodiimide equivalent per solids content: 429) (solids content: 5 parts), and 4 parts of the phosphate group-containing acrylic resin solution produced in Production Example 11 (solids content: 2 parts) were evenly mixed. Then, 1.6 parts of N-ethylmorpholine was added as a basic compound (D) for adjusting pH, and the pH was adjusted to 8.2. Next, "UH-752" (product name, available from ADEKA Corporation, a thickening agent) and deionized water were added, resulting in an aqueous coating material composition No. 1 having a pH of 8.2, a coating material solids content of 48%, and a viscosity of 30 seconds at 20° C. as measured with a Ford cup No. 4.

Examples 2 to 18 and Comparative Examples 1 to 6

Aqueous coating material compositions No. 2 to 24 having a viscosity of 30 seconds at 20° C. as measured with a Ford cup No. 4 were produced in the same manner as in Example 1 except that the formulations were those presented in Table 1-1 to Table 1-4 below instead.

The storage stability of each of the aqueous coating material compositions No. 1 to 24 was evaluated based on the rate of change in viscosity.

Storage stability: evaluated by the rate of change between the viscosity immediately after production and the viscosity after allowing to stand at 40° C. for 10 days, based on the viscosity after 1 minute at 60 rpm measured using "LVDV-I" (product name, available from Brookfield, B-type viscometer).

Viscosity change rate (%) =

$$\left| \left( \text{viscosity after standing at } 40° \text{ C. for 10 days} / \text{viscosity immediately after production} \right) - 1 \right| \times 100$$

Excellent and Good are acceptable.

Excellent: The rate of change in viscosity was less than 20%.

Good: The rate of change in viscosity was 20% or greater and less than 50%.

Poor: The rate of change in viscosity was 50% or greater.

The results of the rate of change in viscosity as well as the storage stability are presented in Table 1-1 to Table 1-4.

TABLE 1-1

| | | | Examples | | | | | |
|---|---|---|---|---|---|---|---|---|
| | | | 1 | 2 | 3 | 4 | 5 | 6 |
| Aqueous Coating Material Composition No. | | | 1 | 2 | 3 | 4 | 5 | 6 |
| Pigment | Pigment Dispersion Liquid Name | | P-1 | P-1 | P-1 | P-1 | P-1 | P-1 |
| Dispersion | Hydroxyl Group- | Polyester Resin Solution (A2-1) | 20 | 20 | 20 | 20 | 20 | 20 |
| Liquid | and Carboxyl Group-Containing Resin (A) | Polyester Resin Solution (A2-2) | | | | | | |
| | Pigment | "JR-806" | 100 | 100 | 100 | 100 | 100 | 100 |
| | | "Carbon MA-100" | 1 | 1 | 1 | 1 | 1 | 1 |
| Hydroxyl Group- and Carboxyl Group-Containing Resin (A) | | Acrylic Resin Particles (A1'-1) | 25 | 25 | 25 | 25 | | 25 |
| | | Acrylic Resin Particles (A1'-2) | | | | | | |
| | | Acrylic Resin Particles (A1"-1) | | | | | 25 | |
| | | Polyurethane Resin Dispersion Liquid (A3-1) | 20 | 20 | 20 | 20 | 20 | 20 |
| | | Polyurethane Resin Dispersion Liquid (A3-2) | | | | | | |

TABLE 1-1-continued

| | | Examples | | | | | |
|---|---|---|---|---|---|---|---|
| | | 1 | 2 | 3 | 4 | 5 | 6 |
| Other Resins | Polyurethane Resin Dispersion Liquid (U-1) | | | | | | |
| Blocked Polyisocyanate Compound (B) | Blocked Polyisocyanate Compound (B-1) | 30 | 30 | 30 | 30 | 30 | 25 |
| | Blocked Polyisocyanate Compound (B-2) | | | | | | |
| Polycarbodiimide Compound (C) | "Carbodilite SV02" | 5 | 5 | 5 | 5 | 5 | 5 |
| Melamine Resin (E) | "Cymel 325" | | | | | | 5 |
| Curing catalyst | Phosphate Group-Containing Acrylic Resin Solution | 2 | 2 | 2 | 2 | 2 | 2 |
| Basic Compound (D) for Adjusting pH | Basic Compound (D1) — N-ethylmorpholine | 1.6 | 2.2 | 2.4 | 2.8 | 2.8 | 2.8 |
| | N-methylmorpholine | | | | | | |
| | Morpholine | | | | | | |
| | Triallylamine | | | | | | |
| | Basic Compound (D) Other Than Basic Compound (D1) — 2-(dimethylamino)ethanol | | | 0.6 | 1.6 | 1.6 | 1.6 |
| | Triethylamine | | | | | | |
| pH of Aqueous Coating Material Composition | | 8.2 | 8.8 | 9.4 | 10 | 10 | 10 |
| Total Amount of Basic Compound (D1) Added (in Parts) | | 5.0 | 5.6 | 5.8 | 6.2 | 6.2 | 6.2 |
| Total Amount of Basic Compound (D) Added (in Parts) | | 5.0 | 5.6 | 6.4 | 7.8 | 7.8 | 7.8 |
| Amount of Basic Compound (D1) in Basic Compound (D) (in Mass %) | | 100 | 100 | 91 | 79 | 79 | 79 |
| Storage Stability | Rate of Change in Viscosity | Good | Good | Good | Excellent | Excellent | Excellent |

TABLE 1-2

| | | | Examples | | | | | |
|---|---|---|---|---|---|---|---|---|
| | | | 7 | 8 | 9 | 10 | 11 | 12 |
| Aqueous Coating Material Composition No. | | | 7 | 8 | 9 | 10 | 11 | 12 |
| Pigment Dispersion Liquid | Pigment Dispersion Liquid Name | | P-1 | P-1 | P-1 | P-1 | P-1 | P-1 |
| | Hydroxyl Group- and Carboxyl Group-Containing Resin (A) | Polyester Resin Solution (A2-1) | 20 | 20 | 20 | 20 | 20 | 20 |
| | | Polyester Resin Solution (A2-2) | | | | | | |
| | Pigment | "JR-806" | 100 | 100 | 100 | 100 | 100 | 100 |
| | | "Carbon MA-100" | 1 | 1 | 1 | 1 | 1 | 1 |
| Hydroxyl Group- and Carboxyl Group-Containing Resin (A) | Acrylic Resin Particles (A1'-1) | | 25 | | | | | |
| | Acrylic Resin Particles (A1'-2) | | | | | | | |
| | Acrylic Resin Particles (A1"-1) | | | 25 | 25 | 25 | 25 | 25 |
| | Polyurethane Resin Dispersion Liquid (A3-1) | | 20 | 20 | 20 | | 20 | 20 |
| | Polyurethane Resin Dispersion Liquid (A3-2) | | | | | | | |
| Other Resins | Polyurethane Resin Dispersion Liquid (U-1) | | | | | 20 | | |
| Blocked Polyisocyanate Compound (B) | Blocked Polyisocyanate Compound (B-1) | | | | | | | |
| | Blocked Polyisocyanate Compound (B-2) | | 30 | 30 | 25 | 25 | 25 | 25 |
| Polycarbodiimide Compound (C) | "Carbodilite SV02" | | 5 | 5 | 5 | 5 | 5 | 5 |
| Melamine Resin (E) | "Cymel 325" | | | | 5 | 5 | 5 | 5 |
| Curing catalyst | Phosphate Group-Containing Acrylic Resin Solution | | 2 | 2 | 2 | 2 | 2 | 2 |
| Basic Compound (D) for Adjusting pH | Basic Compound (D1) | N-ethylmorpholine | 2.8 | 2.8 | 2.8 | 2.8 | 0.6 | |
| | | N-methylmorpholine | | | | | | 0.5 |
| | | Morpholine | | | | | | |
| | | Triallylamine | | | | | | |
| | Basic Compound (D) Other Than Basic Compound (D1) | 2-(dimethylamino)ethanol | 1.6 | 1.6 | 1.6 | 1.6 | 2.5 | 2.6 |
| | | Triethylamine | | | | | | |
| pH of Aqueous Coating Material Composition | | | 10 | 10 | 10 | 10 | 10 | 10 |
| Total Amount of Basic Compound (D1) Added (in Parts) | | | 6.2 | 6.2 | 6.2 | 6.2 | 4.0 | 3.9 |

TABLE 1-2-continued

| | | Examples | | | | | |
|---|---|---|---|---|---|---|---|
| | | 7 | 8 | 9 | 10 | 11 | 12 |
| Total Amount of Basic Compound (D) Added (in Parts) | | 7.8 | 7.8 | 7.8 | 7.8 | 6.5 | 6.5 |
| Amount of Basic Compound (D1) in Basic Compound (D) (in Mass %) | | 79 | 79 | 79 | 79 | 61 | 60 |
| Storage Stability | Rate of Change in Viscosity | Excellent | Excellent | Excellent | Excellent | Excellent | Excellent |

TABLE 1-3

| | | Examples | | | | | |
|---|---|---|---|---|---|---|---|
| | | 13 | 14 | 15 | 16 | 17 | 18 |
| Aqueous Coating Material Composition No. | | 13 | 14 | 15 | 16 | 17 | 18 |
| Pigment Dispersion Liquid | Pigment Dispersion Liquid Name | P-1 | P-1 | P-1 | P-2 | P-1 | P-1 |
| Hydroxyl Group- and Carboxyl Group-Containing Resin (A) | Polyester Resin Solution (A2-1) | 20 | 20 | 20 | | 20 | 20 |
| | Polyester Resin Solution (A2-2) | | | | 20 | | |
| Pigment | "JR-806" | 100 | 100 | 100 | 100 | 100 | 100 |
| | "Carbon MA-100" | 1 | 1 | 1 | 1 | 1 | 1 |
| Hydroxyl Group- and Carboxyl Group-Containing Resin (A) | Acrylic Resin Particles (A1'-1) | | | | | 25 | 25 |
| | Acrylic Resin Particles (A1'-2) | | | | | | |
| | Acrylic Resin Particles (A1"-1) | 25 | 25 | 25 | 25 | | |
| | Polyurethane Resin Dispersion Liquid (A3-1) | 20 | 20 | 20 | 20 | 20 | 20 |
| | Polyurethane Resin Dispersion Liquid (A3-2) | | | | | | |
| Additional Resin | Polyurethane Resin Dispersion Liquid (U-1) | | | | | | |
| Blocked Polyisocyanate Compound (B) | Blocked Polyisocyanate Compound (B-1) | | | | | 30 | 30 |
| | Blocked Polyisocyanate Compound (B-2) | 25 | 25 | 25 | 25 | | |
| Polycarbodiimide Compound (C) | "Carbodilite SV02" | 5 | 5 | 5 | 5 | 5 | 5 |
| Melamine Resin (E) | "Cymel 325" | 5 | 5 | 5 | 5 | | |
| Curing catalyst | Phosphate Group-Containing Acrylic Resin Solution | 2 | 2 | 2 | 2 | 2 | 2 |
| Basic Compound (D) for Adjusting pH — Basic Compound (D1) | N-ethylmorpholine | | | | 0.5 | 1.6 | 2 |
| | N-methylmorpholine | | | | | | 1.8 |
| | Morpholine | 0.6 | | | | | |
| | Triallylamine | | 0.8 | | | | |
| Basic Compound (D) Other Than Basic Compound (D1) | 2-(dimethylamino)ethanol | 2.6 | 2.7 | | 1.1 | 2.5 | 4.7 |
| | Triethylamine | | | 2.6 | | | |
| pH of Aqueous Coating Material Composition | | 10 | 10 | 10 | 10 | 10.6 | 11.2 |
| Total Amount of Basic Compound (D1) Added (in Parts) | | 4.0 | 4.2 | 3.9 | 2.4 | 5.4 | 5.2 |
| Total Amount of Basic Compound (D) Added (in Parts) | | 6.6 | 6.9 | 6.5 | 6.3 | 7.9 | 9.9 |
| Amount of Basic Compound (D1) in Basic Compound (D) (in Mass %) | | 60 | 61 | 60 | 38 | 68 | 52 |
| Storage Stability | Rate of Change in Viscosity | Excellent | Excellent | Excellent | Excellent | Excellent | Excellent |

TABLE 1-4

| | | Comparative Example | | | | | |
|---|---|---|---|---|---|---|---|
| | | 1 | 2 | 3 | 4 | 5 | 6 |
| Aqueous Coating Material Composition No. | | 19 | 20 | 21 | 22 | 23 | 24 |
| Pigment Dispersion Liquid | Pigment Dispersion Liquid Name | P-1 | P-2 | P-2 | P-2 | P-1 | P-2 |
| Hydroxyl Group- and Carboxyl Group-Containing Resin (A) | Polyester Resin Solution (A2-1) | 20 | | | | 20 | 20 |
| | Polyester Resin Solution (A2-2) | | 20 | 20 | 20 | | |
| Pigment | "JR-806" | 100 | 100 | 100 | 100 | 100 | 100 |
| | "Carbon MA-100" | 1 | 1 | 1 | 1 | 1 | 1 |

TABLE 1-4-continued

| | | Comparative Example | | | | | |
|---|---|---|---|---|---|---|---|
| | | 1 | 2 | 3 | 4 | 5 | 6 |
| Hydroxyl Group- and Carboxyl Group- | Acrylic Resin Particles (A1'-1) | 25 | | | | 25 | 25 |
| Containing Resin (A) | Acrylic Resin Particles (A1'-2) | | 25 | 25 | 25 | | |
| | Acrylic Resin Particles (A1"-1) | | | | | | |
| | Polyurethane Resin Dispersion Liquid (A3-1) | 20 | | | | 20 | 20 |
| | Polyurethane Resin Dispersion Liquid (A3-2) | | 20 | 20 | 20 | | |
| Additional Resin | Polyurethane Resin Dispersion Liquid (U-1) | | | | | | |
| Blocked Polyisocyanate Compound (B) | Blocked Polyisocyanate Compound (B-1) | 30 | 30 | 30 | 30 | | 30 |
| | Blocked Polyisocyanate Compound (B-2) | | | | | | |
| Polycarbodiimide Compound (C) | "Carbodilite SV02" | 5 | 5 | 5 | 5 | 5 | |
| Melamine Resin (E) | "Cymel 325" | | | | | 30 | 5 |
| Curing catalyst | Phosphate Group-Containing Acrylic Resin Solution | 2 | 2 | 2 | 2 | 2 | 2 |
| Basic Compound (D) for Adjusting pH — Basic Compound (D1) | N-ethylmorpholine | 1.3 | 1.2 | 1 | 3.5 | 0.6 | 0.6 |
| | N-methylmorpholine | | | | | | |
| | Morpholine | | | | | | |
| | Triallylamine | | | | | | |
| Basic Compound (D) Other Than Basic Compound (D1) | 2-(dimethylamino)ethanol | | 2.4 | | | 2.6 | 2.6 |
| | Triethylamine | | | 2.4 | 3.1 | | |
| pH of Aqueous Coating Material Composition | | 7.8 | 10 | 10 | 11.7 | 10 | 10 |
| Total Amount of Basic Compound (D1) Added (in Parts) | | 4.7 | 1.2 | 1.0 | 3.5 | 4.0 | 4.0 |
| Total Amount of Basic Compound (D) Added (in Parts) | | 4.7 | 6.1 | 5.9 | 9.1 | 6.6 | 6.6 |
| Amount of Basic Compound (D1) in Basic Compound (D) (in Mass %) | | 100 | 20 | 17 | 39 | 60 | 60 |
| Storage Stability | Rate of Change in Viscosity | Poor | Excellent | Excellent | Excellent | Excellent | Poor |

Preparation of Object to be Coated for Testing

A cold-rolled steel sheet having undergone a zinc phosphate treatment was electrodeposition-coated with a thermosetting epoxy resin-based cationic electrodeposition coating material composition (product name "Elecron GT-10", available from Kansai Paint Co., Ltd.) to give a film thickness of 20 μm, and curing was performed by heating at 170° C. for 30 minutes. This resulted in an object to be coated that is a steel sheet having an electrodeposition coating film formed thereon.

Preparation of Coated Sheet for Testing

Example 19

The object to be coated was electrostatically coated with the aqueous coating material composition No. 1 produced in Example 1 by a rotary atomizing-type electrostatic coating machine to give a cured film thickness of 20 μm. The resulting product was then allowed to stand for 5 minutes to form an uncured intermediate coating film.

Next, the uncured intermediate coating film was electrostatically coated with "WBC-713T No. 202" (product name, available from Kansai Paint Co., Ltd., an acrylic melamine resin-based aqueous basecoat coating material, black color) using a rotary atomizing-type electrostatic coating machine to give a dried film thickness of 15 μm. The resulting product was then allowed to stand for 5 minutes and subsequently preheated at 80° C. for 3 minutes to form an uncured basecoat coating film.

Next, the uncured basecoat coating film was electrostatically coated with "Soflex #520 Clear" (available from Kansai Paint Co., Ltd., product name, a two-component acrylic urethane-based organic solvent-type clear coating material containing hydroxyl group-containing acrylic resin and polyisocyanate compound) to give a dried film thickness of 35 μm. The resulting product was then allowed to stand for 7 minutes to form a clear coating film.

Then, the intermediate coating film, the basecoat coating film, and the clear coating film were heated at 80° C. for 30 minutes and cured, resulting in a coated sheet for testing.

Examples 20 to 38 and Comparative Examples 7 to 12

Test sheets were prepared in the same manner as in Example 19, except that the type of aqueous coating material composition and the heating temperature used in Example 19 were changed to those presented in Table 2 below.

The test sheets prepared above were evaluated through the following test methods. The evaluation results are presented in Table 2 below.

Test Method

Low-temperature curability: The pencil hardness of the test sheets prepared in the Examples and Comparative Examples above was measured in accordance with "Scratch Hardness (Pencil Method)" in JIS K 5600-5-4 (1999). The pencil hardness is in the order of 3B<2B<B<HB<F, and a pencil hardness of HB or above is deemed as acceptable. The evaluation results are presented in Table 2.

Adhesion after water exposure: The test sheets prepared in the Examples and Comparative Examples above were immersed in 40° C. warm water for 240 hours. Afterwards, the test sheets were retrieved, and the moisture on the surface was wiped off. Immediately after that, a grid of 100 pieces of 2 mm×2 mm squares was made in accordance with JIS K 5600-5-6 (1990) on the coated surface of each of the coating films. A pressure-sensitive adhesive tape was attached to the surface with the grid and rapidly peeled off, and the number of grids of coating film remaining on the coated surface was evaluated. Excellent and Good are acceptable. The evaluation results are presented in Table 2.

Excellent: Remaining number/total number=100/100 with no edge chipping

Good: Remaining number/total number=100/100 with edge chipping

Fair: Remaining number/total number=99 to 90/100

Poor: Remaining number/total number=89 or less/100.

Hardness after water exposure: The test sheets prepared in the Examples and Comparative Examples above were immersed in 40° C. warm water for 240 hours and dried at 20° C. for 12 hours. Then, the pencil hardness of the coated surface of each test sheet was measured in accordance with "Scratch Hardness (Pencil Method)" in JIS K 5600-5-4 (1999). A pencil hardness of B or above is deemed as acceptable. The evaluation results are presented in Table 2.

Chipping resistance: The test sheets prepared in the Examples and Comparative Examples above were placed on a specimen holding table of a gravel test instrument "JA-400 Type" (product name, available from Suga Test Instruments Co., Ltd., chipping resistance tester), and 50 g of granite gravel having a grain size of No. 7 was caused to collide with the test sheets at 0° C. and at an angle of 45 degrees from a distance of 30 cm away from the test sheets by compressed air of 0.39 MPa (4 kgf/cm2). Thereafter, the obtained test plate was washed with water and dried, and a cloth adhesive tape (available from Nichiban Co., Ltd.) was attached to the coated surface and peeled off, and then a degree of occurrence of scratches on the coating film was visually observed and evaluated according to the following criteria. Excellent and Good are acceptable. The evaluation results are presented in Table 2.

Excellent: The size of a scratch is extremely small, and neither electrodeposited surface nor the base steel sheet is exposed.

Good: The size of a scratch is small, and neither electrodeposited surface nor the base steel sheet is exposed.

Fair: The size of a scratch is small, but the electrodeposited surface or the base steel sheet is exposed.

Poor: The size of a scratch is considerably large, and the base steel sheet is also largely exposed.

Glass adhesiveness: A urethane-based adhesive (product name "3740", available from Sunstar Inc., a windshield agent for automobiles) was further applied onto each of the coated sheets for testing prepared in the Examples and Comparative Examples above in a shape having a width of 20 mm, a thickness of 3 mm, and a length of 100 mm or greater, and a piece of release paper was placed thereon. Then, the resulting product was evenly pressed with a flat plate. After the flat plate was removed, the resulting product was left to stand at a temperature of 23±2° C. and a humidity of 50±5% for 72 hours and was cured. Thereafter, the release paper was peeled off. Next, each of the coated sheets for testing was immersed in a constant-temperature water bath set at 50° C. for 240 hours, then cooled by being immersed in water at 23° C. for 1 hour, and subjected to the following peeling test.

While the cured adhesive layer was pulled by hand in a direction of 90 degrees or more with respect to the coating film, cuts reaching the coating film surface were made in the cured adhesive layer with a cutter knife at intervals of 2 to 3 mm at an angle of approximately 60 degrees with respect to the coating film. A peeling state after peeling off the adhesive layer was evaluated according to the following criteria. Excellent, Good+ and Good are acceptable.

Excellent: Peeling of the adhesive layer was not observed, and exposure of the coating film was not observed.

Good+: The coating film was not damaged, and only the adhesive layer underwent cohesive failure and was peeled off, but the adhesion between the coating film and the adhesive layer was maintained for the most part.

Good: The coating film underwent cohesive failure and was peeled off, and the width of the peeling was less than 1 mm from the portion cut with the cutter knife.

Fair: The coating film underwent cohesive failure and was peeled off, and the width of the peeling was 1 mm or greater from the portion cut with the cutter knife.

Poor: Peeling was observed at the interface between the coating film and the adhesive layer.

TABLE 2

| | | Aqueous Coating | | Evaluation Result | | | | |
|---|---|---|---|---|---|---|---|---|
| | | Material Composition No. | Heating Temperature | Low-Temperature Curability | Adhesion After Water Exposure | Hardness After Water Exposure | Chipping resistance | Glass adhesiveness |
| Examples | 19 | 1 | 80° C. | F | Excellent | HB | Good | Excellent |
| | 20 | 2 | 80° C. | F | Excellent | HB | Good | Excellent |
| | 21 | 3 | 80° C. | HB | Good | HB | Good | Excellent |
| | 22 | 4 | 80° C. | HB | Good | HB | Good | Good |
| | 23 | 5 | 80° C. | F | Excellent | HB | Good | Excellent |
| | 24 | 6 | 80° C. | HB | Good | HB | Good | Good |
| | 25 | 7 | 80° C. | HB | Good | HB | Excellent | Good |
| | 26 | 8 | 80° C. | F | Excellent | HB | Excellent | Excellent |
| | 27 | 9 | 80° C. | F | Excellent | HB | Excellent | Good+ |
| | 28 | 10 | 80° C. | F | Excellent | HB | Excellent | Good+ |
| | 29 | 11 | 80° C. | F | Good | HB | Excellent | Good+ |
| | 30 | 11 | 70° C. | HB | Good | HB | Good | Good |
| | 31 | 11 | 100° C. | F | Excellent | HB | Excellent | Excellent |
| | 32 | 12 | 80° C. | F | Good | HB | Excellent | Good+ |
| | 33 | 13 | 80° C. | HB | Good | HB | Excellent | Good+ |
| | 34 | 14 | 80° C. | HB | Good | HB | Good | Good |
| | 35 | 15 | 80° C. | F | Good | HB | Excellent | Good+ |
| | 36 | 16 | 80° C. | HB | Good | HB | Good | Good |
| | 37 | 17 | 80° C. | HB | Good | HB | Good | Good |
| | 38 | 18 | 80° C. | HB | Good | HB | Good | Good |
| Comparative Examples | 7 | 19 | 80° C. | F | Excellent | HB | Good | Excellent |
| | 8 | 20 | 80° C. | B | Fair | B | Good | Fair |
| | 9 | 21 | 80° C. | HB | Good | B | Good | Fair |
| | 10 | 22 | 80° C. | HB | Fair | B | Good | Fair |

TABLE 2-continued

| Aqueous Coating | | | Evaluation Result | | | | |
| Material Composition No. | Heating Temperature | Low-Temperature Curability | Adhesion After Water Exposure | Hardness After Water Exposure | Chipping resistance | Glass adhesiveness |
| --- | --- | --- | --- | --- | --- | --- |
| 11 | 23 | 80° C. | B | Poor | 3B | Poor | Poor |
| 12 | 24 | 80° C. | B | Fair | B | Fair | Poor |

Although embodiments and examples of the present invention have been specifically described above, the present invention is not limited to the embodiments described above, and various modifications based on the technical idea of the present invention are possible.

For example, the configurations, methods, processes, shapes, materials, numerical values, etc., given in the above-described embodiments and examples are merely examples, and different configurations, methods, processes, shapes, materials, numerical values, etc., may be used when necessary.

Also, the configurations, methods, processes, shapes, materials, numerical values, etc. of the above-described embodiments can be combined with each other without departing from the gist of the present invention.

The invention claimed is:

1. An aqueous coating material composition comprising
(A) a hydroxyl group- and carboxyl group-containing resin,
(B) a blocked polyisocyanate compound,
(C) a polycarbodiimide compound, and
(D) a basic compound,
wherein
the basic compound (D) includes (D1) a basic compound having an acid dissociation constant (PKa) in a range from 7.0 to 8.5 and a boiling point in a range from 100° C. to 200° C.;
a content ratio of the basic compound (D1) is in a range from 35 mass % to 90 mass % based on a mass of the basic compound (D); and
the aqueous coating material composition has a pH in a range from 8.0 to 11.5.

2. The aqueous coating material composition according to claim 1, wherein at least part of a blocking agent of the blocked polyisocyanate compound (B) is an active methylene-based blocking agent.

3. The aqueous coating material composition according to claim 1, wherein the basic compound (D1) having the acid dissociation constant (PKa) in the range from 7.0 to 8.5 and the boiling point in the range from 100 to 200° C. is N-methylmorpholine and/or N-ethylmorpholine.

4. The aqueous coating material composition according to claim 1, further comprising a melamine resin (E).

5. The aqueous coating material composition according to claim 1, wherein at least part of a blocking agent of the blocked polyisocyanate compound (B) is an active methylene-based blocking agent and the basic compound (D1) having the acid dissociation constant (PKa) in the range from 7.0 to 8.5 and the boiling point in the range from 100 to 200° C. is N-methylmorpholine and/or N-ethylmorpholine.

6. A method of forming a multilayer coating film comprising, in sequence:
(1) applying the aqueous coating material composition according to claim 1 onto an object to be coated to form an intermediate coating film;
(2) applying an aqueous basecoat coating material composition onto the intermediate coating film formed in (1) to form a basecoat coating film;
(3) applying a clear coating material composition onto the basecoat coating film formed in (2) to form a clear coating film; and
(4) heating and curing, all at once at a temperature in a range from 60 to 110° C., the intermediate coating film formed in (1), the basecoat coating film formed in (2), and the clear coating film formed in (3).

* * * * *